United States Patent
Yamamoto et al.

(10) Patent No.: US 10,900,988 B2
(45) Date of Patent: Jan. 26, 2021

(54) ROTARY MACHINE

(71) Applicant: AICHI STEEL CORPORATION, Tokai (JP)

(72) Inventors: Michiharu Yamamoto, Aichi (JP); Tomohiko Nagao, Aichi (JP); Takeshi Kawano, Aichi (JP); Koei Gemba, Aichi (JP)

(73) Assignee: AICHI STEEL CORPORATION, Tokai (JP)

(*) Notice: Subject to any disclaimer, the term of this patent is extended or adjusted under 35 U.S.C. 154(b) by 36 days.

(21) Appl. No.: 16/306,789

(22) PCT Filed: May 31, 2017

(86) PCT No.: PCT/JP2017/020330
§ 371 (c)(1),
(2) Date: Dec. 3, 2018

(87) PCT Pub. No.: WO2017/213004
PCT Pub. Date: Dec. 14, 2017

(65) Prior Publication Data
US 2019/0137536 A1 May 9, 2019

(30) Foreign Application Priority Data
Jun. 9, 2016 (JP) .................. 2016-114992

(51) Int. Cl.
*G01B 7/30* (2006.01)
*G01P 3/487* (2006.01)
(Continued)

(52) U.S. Cl.
CPC .............. *G01P 3/487* (2013.01); *F01D 17/06* (2013.01); *G01D 5/14* (2013.01); *G01P 1/00* (2013.01); *G01P 1/026* (2013.01); *F05B 2220/40* (2013.01)

(58) Field of Classification Search
CPC .......... G01D 5/14; G01D 5/145; G01D 5/147; G01D 5/202; G01D 5/206; G01D 5/225;
(Continued)

(56) References Cited

U.S. PATENT DOCUMENTS 4,857,784 A * 8/1989 Mukaekubo ............ G01P 3/487
310/68 B
5,602,472 A 2/1997 Bergstedt et al.
(Continued)

FOREIGN PATENT DOCUMENTS

EP 0 606 942 A1 7/1994
JP 2006-58274 A 3/2006
(Continued)

OTHER PUBLICATIONS

International Search Report dated Aug. 29, 2017 in PCT/JP2017/020330 filed May 31, 2017.
(Continued)

*Primary Examiner* — Thang X Le
(74) *Attorney, Agent, or Firm* — Oblon, McClelland, Maier & Neustadt, L.L.P.

(57) ABSTRACT

Provided is a rotary machine in which the output of a magnetic sensor is hardly lowered even if the rotation speed of a rotor becomes high. The rotary machine includes a rotor, a housing, a magnet, and a magnetic sensor. The rotor axially rotates around a rotation axis. The housing is formed of a conductive material and contains the rotor. The magnet is attached to the rotor such that an arrangement direction of a pair of magnetic poles is in a radial direction of the rotor. The magnetic sensor is attached to the housing. The magnetic sensor detects a time variation of a magnetic field generated from the magnet to detect the rotation speed of the rotor. The magnetic sensor is located on the outside than the magnet in the radial direction. The magnetism sensing
(Continued)

direction of the magnetic sensor is orthogonal to the radial direction.

19 Claims, 24 Drawing Sheets

(51) Int. Cl.
*G01P 1/02* (2006.01)
*G01P 1/00* (2006.01)
*F01D 17/06* (2006.01)
*G01D 5/14* (2006.01)

(58) Field of Classification Search
CPC .......... G01D 5/2208; G01D 5/12; G01D 5/16; G01D 5/2457; G01D 5/2013; G01D 5/2046; G01R 33/0206; G01R 33/06; G01R 33/063; G01R 33/09; G01R 33/093; G01R 33/0052; G01R 33/18
See application file for complete search history.

(56) References Cited

U.S. PATENT DOCUMENTS

| | | | |
|---|---|---|---|
| 5,670,877 A | 9/1997 | Scheiber | |
| 5,742,160 A | 4/1998 | Bergstedt et al. | |
| 6,016,055 A * | 1/2000 | Jager | G01P 3/487 324/165 |
| 6,124,709 A * | 9/2000 | Allwine | G01D 5/145 324/207.2 |
| 6,265,867 B1 | 7/2001 | Fowler | |
| 6,483,296 B1 * | 11/2002 | Hamaoka | G01D 5/145 324/207.2 |
| 6,919,657 B2 * | 7/2005 | Horng | H02K 1/187 310/51 |
| 10,408,892 B2 * | 9/2019 | David | G01R 33/02 |
| 2007/0075703 A1 | 4/2007 | Biber et al. | |
| 2007/0186551 A1 | 8/2007 | Ante et al. | |
| 2009/0060716 A1 | 3/2009 | Ante et al. | |
| 2010/0175375 A1 | 7/2010 | Gilch et al. | |
| 2010/0321008 A1 | 12/2010 | Mita et al. | |

FOREIGN PATENT DOCUMENTS

| | | |
|---|---|---|
| JP | 2008-506074 A | 2/2008 |
| JP | 5032578 B2 | 9/2012 |
| JP | 2015-127652 A | 7/2015 |
| WO | WO 2009/099054 A1 | 8/2009 |
| WO | WO 2013/069524 A1 | 5/2013 |

OTHER PUBLICATIONS

Partial Supplementary European Search Report dated Apr. 4, 2019 in Patent Application No. 17810182.0, 13 pages.
Mohri, K. et al., "Recent Advances of Amorphous Wire CMOS IC Magneto-Impedance Sensors: Innovative High-Performance Micromagnetic Sensor Chip", Journal of Sensors, XP055357503, vol. 2015, Jan. 1, 2015, pp. 1-8 and cover page.
English translation of the International Preliminary Report on Patentability and Written Opinion dated Dec. 20, 2018 in PCT/JP2017/020330.
Extended European Search Report dated Jul. 3, 2019 in European Patent Application No. 17810182.0, 13 pages.
Ortner, M. et al. "Signal Analysis in Back Bias Speed Sensor Systems", European Modelling Symposium, IEEE, XP032583571, Nov. 20, 2013, pp. 706-714.

* cited by examiner

ROTARY MACHINE

TECHNICAL FIELD

The present invention relates to a rotary machine such as a turbocharger.

BACKGROUND ART

As a rotary machine serving as a turbocharger, or the like, a rotary machine that includes a rotor configured to axially rotate around a rotation axis and a housing configured to house the rotor is known (refer to, for example, Patent Document 1 mentioned below). In this rotary machine, the rotor has a magnet attached thereto so that the rotation speed of the rotor can be measured. The magnet is attached to the rotor such that the arrangement direction of a pair of magnetic poles is the same as the radial direction of the rotor. Further, the rotary machine is provided with a magnetic sensor outside the housing.

When the rotor rotates, the magnet rotates along with this rotation. Thus, a magnetic field acting on the magnetic sensor varies with time, and accordingly an output of the magnetic sensor varies with time. The rotary machine is configured such that the rotation speed of the rotor is detected on the basis of the time variation of the output of the magnetic sensor.

In recent years, in order that the rotation speed of the rotor can be measured more accurately, researches have been conducted to enhance the output of the magnetic sensor. For this purpose, the magnetic sensor is attached to the housing, and attempts to arrange the magnetic sensor as close as possible to the magnet have been made. In particular, techniques that make it possible to measure the rotation speed accurately with high sensitivity even when the rotation speed is extremely high, have been demanded.

In the past, it was considered that the magnetic sensor has only to be arranged at the position adjacent to the magnet in the radial direction of the rotor and the magnetic sensitive direction of the magnetic sensor has only to be the same as the radial direction (refer to FIG. 24). It is because it has been considered that such arrangement makes it possible to arrange the magnetic sensor close to the magnet, and at the same time to increase the output of the magnetic sensor because the magnetic field of the magnet acts on the magnetic sensor in the magnetism sensing direction.

PRIOR ART LITERATURE

Patent Document

Patent Document 1: Japanese Patent No. 5032578

SUMMARY OF THE INVENTION

Problem to be Solved by the Invention

However, as the result of experiments conducted by the present inventors, it was found that when the abovementioned configuration being adopted, the output of the magnetic sensor is lowered as the rotation speed of the rotor becomes high (refer to FIG. 25). This is considered, by the assumption, to be caused by an eddy current that generates in the housing. In other words, because the housing is formed of a conductive material such as metal or the like, when the magnetic field of the magnet that acts on the housing varies with time by rotation of the magnet, an eddy current generates inside the housing. The lowering of the output of the magnetic sensor is considered to be caused by cancelling out of the magnetic field of the magnet by the magnetic field generated by the eddy current. When the rotation speed of the magnet becomes high, the time variation rate of the magnetic field of the magnet that acts on the housing becomes high. Accordingly, the eddy current increases, and thus the magnetic field of the magnet can be easily cancelled out. For this reason, it can be considered that the output of the magnetic sensor is lowered as the rotation speed becomes high. As mentioned above, there is a possibility that it becomes difficult in some cases for the abovementioned configuration to be applied to rotary machines in which the rotor rotates at extremely high speed.

The present invention has been made in view of such a background, and it is intended to provide a rotary machine in which the output of a magnetic sensor is hardly lowered even if the rotation speed of a rotor becomes high.

Means for Solving the Problem

One aspect of the present invention is a rotary machine including: a rotor configured to axially rotate around a rotation axis;

a housing formed of a conductive material and containing the rotor;

a magnet attached to the rotor such that an arrangement direction of at least a pair of magnetic poles is in a radial direction of the rotor; and a magnetic sensor attached to the housing and configured to detect a time variation of a magnetic field generated from the magnet to thereby detect a rotation speed of the rotor, wherein the magnetic sensor is arranged on the outside than the magnet in the radial direction, and wherein a magnetism sensing direction of the magnetic sensor is orthogonal to the radial direction.

Effects of the Invention

In the rotary machine, the magnet is attached to the rotor such that the arrangement direction of the pair of magnetic poles is the same as the radial direction of the rotor. In addition, the magnetic sensor is attached to the housing. And, the magnetism sensing direction of the magnetic sensor is set orthogonal to the radial direction.

As the result of experiments conducted by the present inventors, it was found that if the abovementioned configuration is adopted, the output of the magnetic sensor is hardly lowered even if the rotation speed of the rotor becomes high, and instead the output becomes higher (refer to FIG. 8 and FIG. 9). The reason is considered that the magnetic field of the magnet and the magnetic field caused by the eddy current are not cancelled with each other, and rather intensify each other with being directed in the same direction. This is considered to be the reason why the output of the magnetic sensor becomes high as the rotation speed of the magnet becomes high and the eddy current generate more largely in the housing. For this reason, by means of arranging the magnetic sensor such that the magnetism sensing direction is set orthogonal to the radial direction, the output of the magnetic sensor can remain at a high level even if the rotation speed of the rotor becomes high, to thereby detect the rotation speed of the rotor accurately.

As mentioned above, the present aspect can provide a rotary machine in which the output of the magnetic sensor is hardly lowered even if the rotation speed of the rotor becomes high.

It is noted that in the present invention, variation of the magnetic field of the magnet is measured by the magnetic sensor. Therefore, cases where the magnetic sensor is attached in such a manner not to measure the magnetic field of the magnet are out of the present invention. For example, in case, as shown in FIG. 26, a center 59 of a magnetic sensor 5 is aligned with a center 49 of a magnet 4 in the axial direction (X direction), and the magnetism sensing direction of the magnetic sensor 5 (the longitudinal direction of the magnetic sensor 5) is in X direction, the magnetic field of the magnet 4 acts on the center 59 of the magnetic sensor 5 with the almost same intensity in the left and right directions. Therefore, the actual magnetic field that acts on the magnetic sensor 5 is made almost zero. Accordingly, the magnetic field of the magnetic 4 cannot be measured, and thus the rotation speed of a rotor 2 cannot be measured. Such a manner to attach the magnetic sensor 5 is out of the present invention.

Further, as mentioned above, in the present invention, the magnetism sensing direction of the magnetic sensor is orthogonal to the radial direction. Here, "the magnetism sensing direction is orthogonal to the radial direction" means that the direction (radial direction) parallel to a straight line SL which passes through the magnetic sensor 5 (refer to FIG. 3) and a rotation axis A and is orthogonal to the rotation axis A is orthogonal to the magnetism sensing direction of the magnetic sensor 5. It is noted that "orthogonal" mentioned here is not strictly restricted, and is permitted to have some displacement. Specifically, displacement at the level of ±10° from the orthogonal can be accepted with no problem.

MODES FOR CARRYING OUT THE INVENTION

The magnetic sensor is preferably arranged at a position apart from the magnet by a prescribed distance in an axial direction of the rotor.

Figure 3:
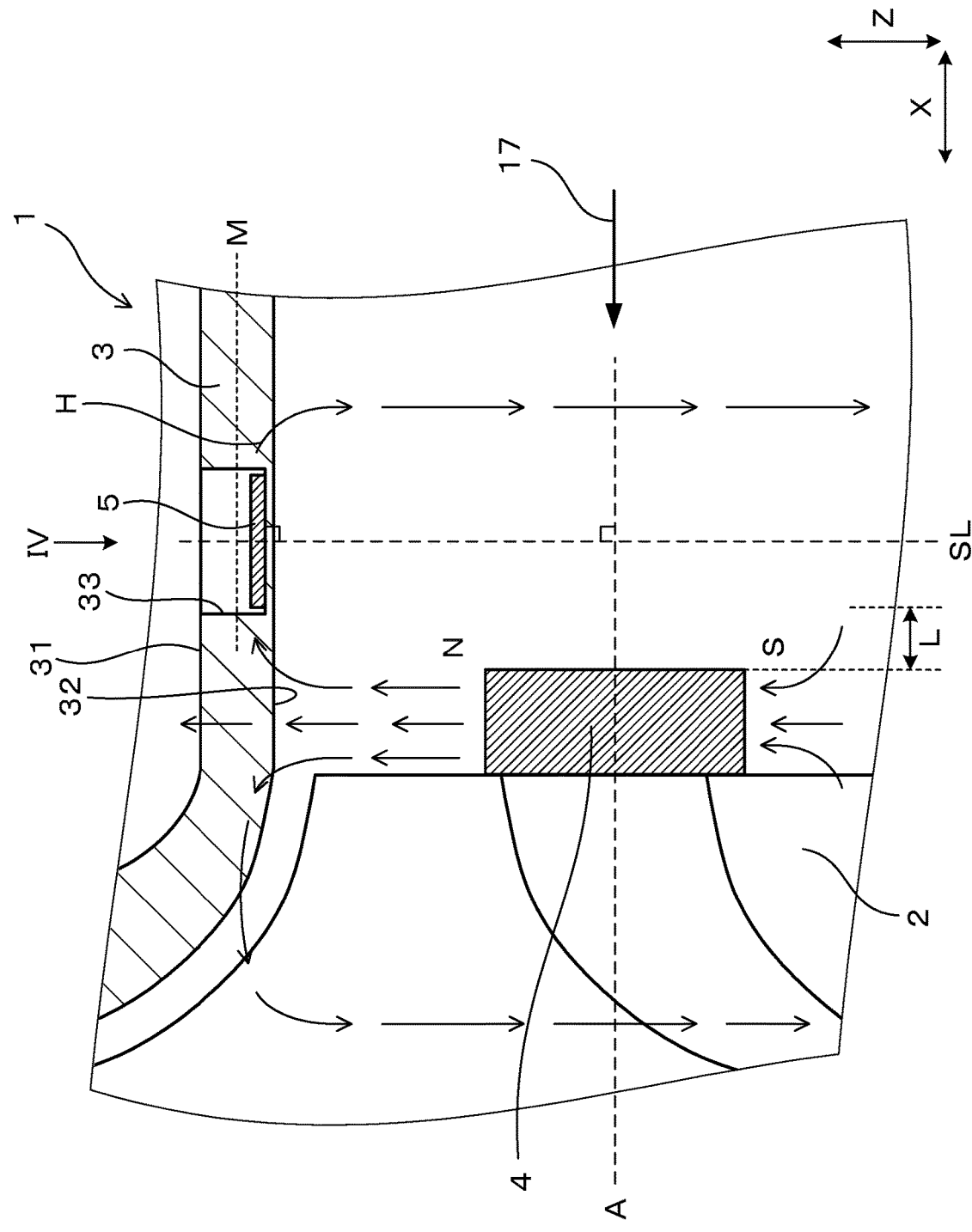
FIG. 3 is an enlarged view of a substantial part of FIG. 1.

Part of the magnetic field generated from the magnet flows in the direction orthogonal to the radial direction inside the housing at the position apart from the magnet in the axial direction (refer to FIG. 3). Therefore, when the magnetic sensor is arranged at the position apart from the magnet by the prescribed distance in the axial direction, the intensity of the magnetic field of the magnet, which acts on the magnetic sensor in the magnetism sensing direction, can be enhanced. Thus, the output of the magnetic sensor can be increased, accordingly the rotation speed of the rotor can be detected accurately.

Further, the magnetic sensor is preferably located on the inside than an intermediate position between an exterior surface and an interior surface of the housing in the radial direction.

In this case, the magnetic sensor can be closer to the magnet. Thus, the output of the magnetic sensor can be increased. Accordingly, the rotation speed of the rotor can be detected more accurately.

Still further, it is preferable that the housing has a recessed part recessively formed inward in the radial direction from the exterior surface of the housing, and the magnetic sensor is arranged in the recessed part.

In this case, when manufacturing the rotary machine, the magnetic sensor can be easily disposed inside the housing from the outside of the housing. In this way, the rotary machine can be readily manufactured. In addition, when the magnetic sensor is disposed in the recessed part, the magnetic sensor can be arranged close to the magnet. Therefore, the output of the magnetic sensor can be increased to thereby detect the rotation speed of the rotor accurately.

Still further, it is preferable that two or more of the magnetic sensors are provided, which differ from each other in output corresponding to the magnetic field generated from the magnet so that the difference of outputs between the two magnetic sensors is used to detect the rotation speed of the rotor.

In this case, it hardly suffers from influence of disturbance magnetic field, so that the rotation speed of the rotor can be measured more accurately. Specifically, even if the disturbance magnetic field acts on the two magnetic sensors from the outside of the rotary machine, the outputs based on this disturbance magnetic field are almost the same between the two magnetic sensors. Therefore, influence of the disturbance magnetic field can be eliminated from the output by calculating the difference between the outputs of the two magnetic sensors. Consequently, it becomes easy to accurately detect the time variation of the magnetic field of the magnet, which makes it possible to detect the rotation speed of the rotor more accurately.

Still further, it is preferable that the rotary machine is used as a turbocharger, the rotor is a compressor wheel of the turbocharger, the housing is a compressor housing containing the compressor wheel, and the magnetic sensor is attached to the compressor housing.

In this case, it becomes possible to measure the rotation speed of the compressor wheel accurately. In addition, because the compressor housing is an intake side housing of a turbocharger, the temperature is lower than that of a turbo housing that is an exhaust side housing. Therefore, by attaching the magnetic sensor to the compressor housing, the magnetic sensor can be prevented from having a high temperature to thereby prevent shortening of the life of the magnetic sensor.

Still further, the magnetic sensor is preferably a magneto-impedance sensor.

A magneto-impedance sensor (hereinafter, also referred to as an MI sensor) has high sensitivity for detecting magnetism and is also excellent in high-speed response. Therefore, although other-type magnetic sensors also can be used, particularly in the case of high-speed rotation at 10000 rpm or higher, by using an MI sensor, time variation of the magnetic field of the magnet can be accurately detected, so that the rotation speed of the rotor can be accurately detected.

Still further, the magnet is preferably attached to the rotation axis.

When the magnet is attached to the rotation axis, the magnet is hardly affected by a centrifugal force accompanied with the rotation of the rotor. Accordingly, any failure, for example, dropping of the magnet by the centrifugal force, etc. can be prevented.

Embodiment 1

Figure 1:
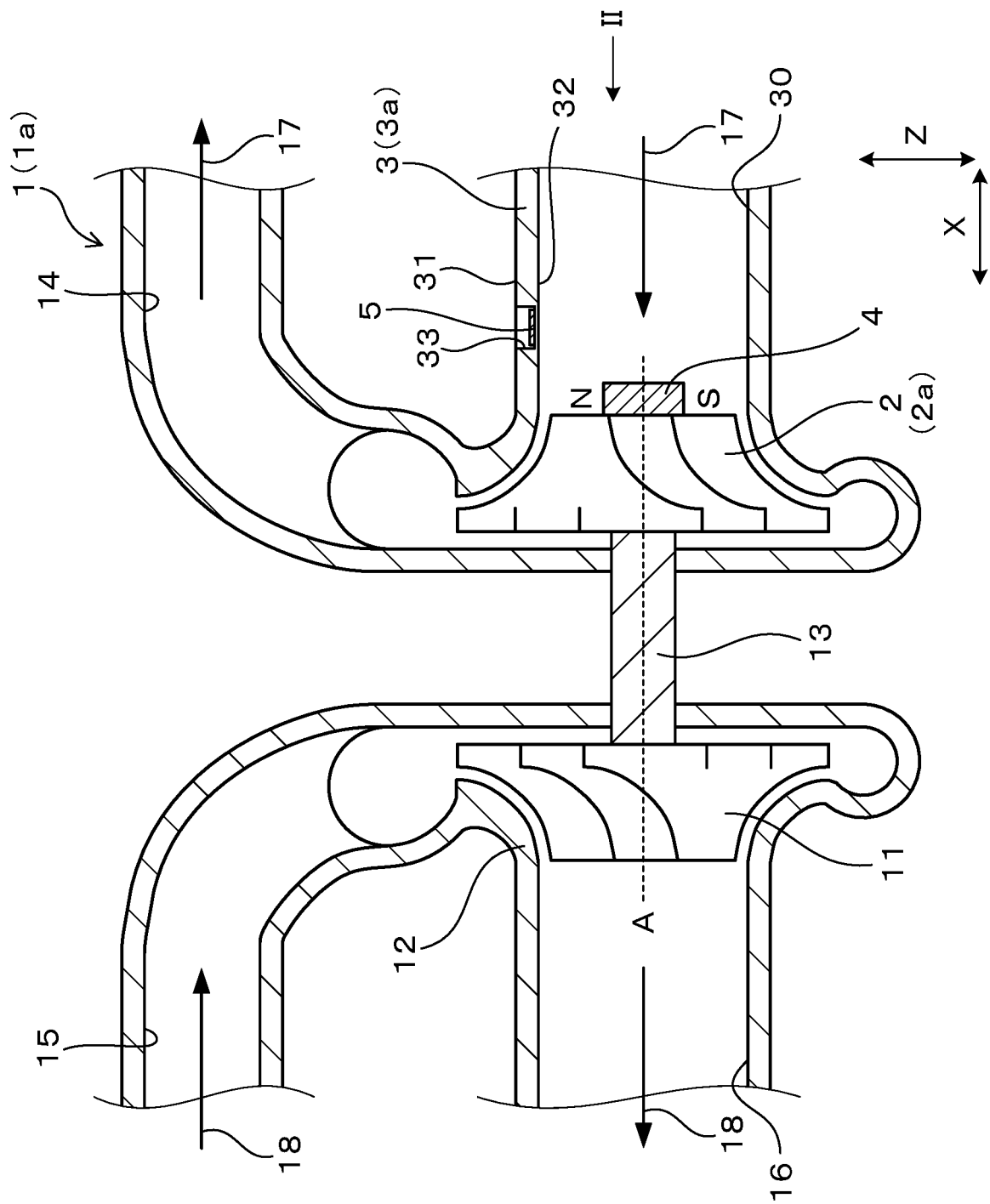
FIG. 1 is a cross-sectional view of a rotary machine according to Embodiment 1, taken along the line I-I in FIG. 2.
Figure 2:
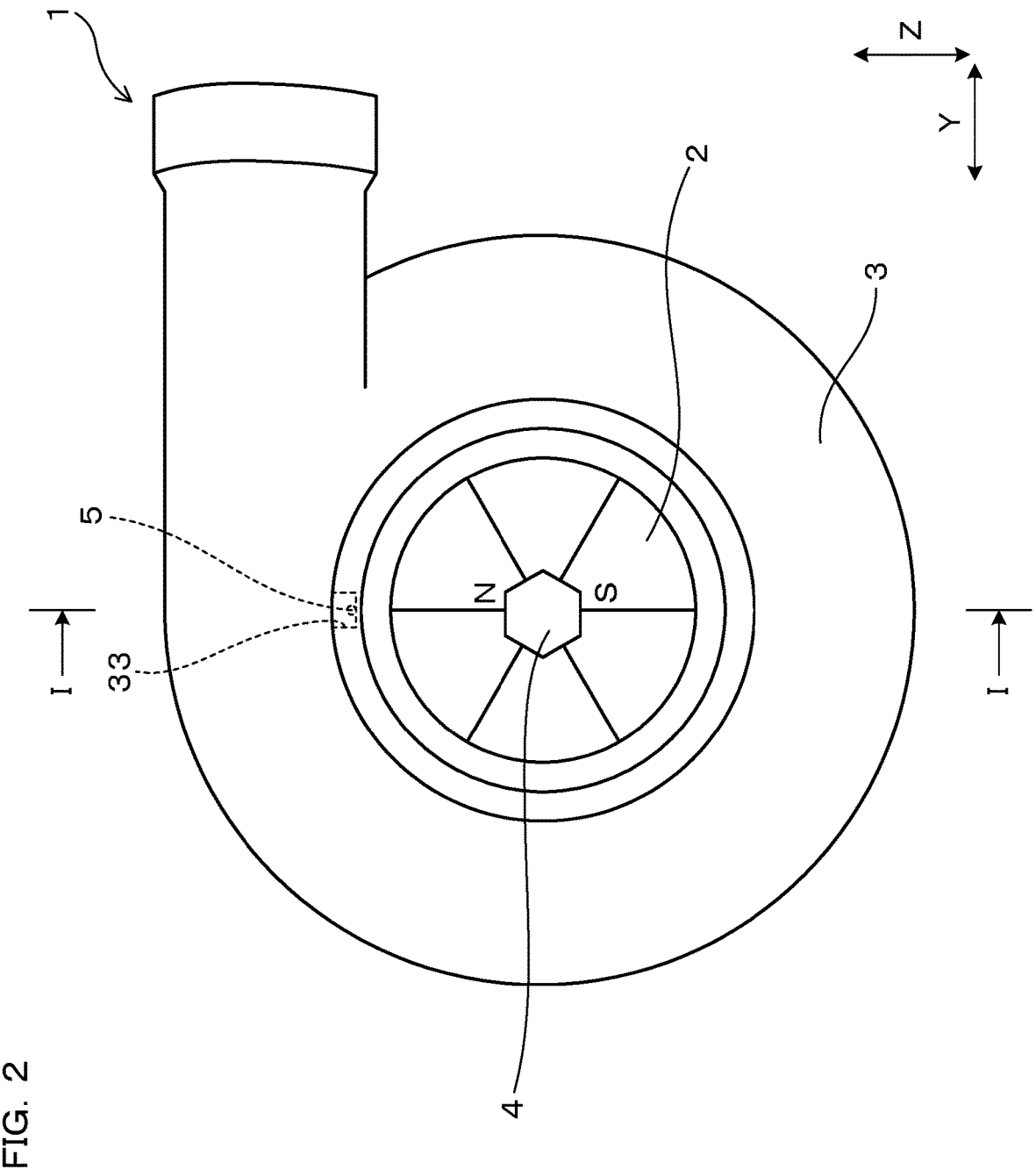
FIG. 2 is an arrow view viewed in the direction of the arrow II in FIG. 1.

An embodiment of the rotary machine will be explained with reference to FIG. 1 to FIG. 9. As shown in FIG. 1 and FIG. 2, a rotary machine 1 of the present embodiment includes a rotor 2, a housing 3, a magnet 4, and a magnetic sensor 5. The rotor 2 axially rotates around a rotation axis A. The housing 3 is formed of a conductive material and contains the rotor 2.

The magnet 4 is attached to the rotor 2 in such a manner that the arrangement direction of a pair of magnetic poles is in a radial direction of the rotor 2. The magnetic sensor 5 is attached to the housing 3. The magnetic sensor 5 detects time variation of the magnetic field generated from the magnet 4. In this way, it is configured to detect rotation speed of the rotor 2.

The magnetic sensor 5 is arranged on the outside than the magnet 4 in the radial direction.

The magnetism sensing direction of the magnetic sensor 5 is orthogonal to the radial direction.

As shown in FIG. 1, the rotary machine 1 of the present embodiment is a turbocharger 1a that is to be installed in an engine of a vehicle, and the like. The turbocharger 1a includes a turbo wheel 11, a turbo housing 12 for housing the turbo wheel 11, a turbo shaft 13, a compressor wheel 2a, a compressor housing 3a for housing the compressor wheel 2a, an air inlet 30, an air outlet 14, an exhaust air inlet 15, and an exhaust air outlet 16. The turbo shaft 13 connects the turbo wheel 11 and the compressor wheel 2a.

The rotor 2 of the present embodiment is the compressor wheel 2a of the turbocharger 1a. And, the housing 3 of the present embodiment is the compressor housing 3a. The magnetic sensor 5 is attached to the compressor housing 3a. The compressor housing 3a is made of aluminum.

When exhaust gas 18 is discharged from the engine not shown in the figure, the turbo wheel 11 rotates. Accompanying the rotation, the compressor wheel 2a also rotates. Accordingly, air 17 is sucked from the air inlet 30 and fed to the engine.

The magnet 4 of the present embodiment is attached such that the center coincides with the rotation axis A of the compressor wheel 2a. The magnet 4 of the present embodiment is a nut that has been magnetized (magnetized nut). Using this magnetized nut, the compressor wheel 2a is tightened to the turbo shaft 13.

As shown in FIG. 3, the magnetic sensor 5 is arranged at a position apart from the magnet 4 by a prescribed distance L in the axial direction (X direction). The magnetic sensor 5 of the present embodiment is a magneto-impedance sensor. The housing 3 has a recessed part 33 recessively formed inward in the radial direction from the exterior surface of the housing. The magnetic sensor 5 is arranged in the recessed part 33.

Figure 4:
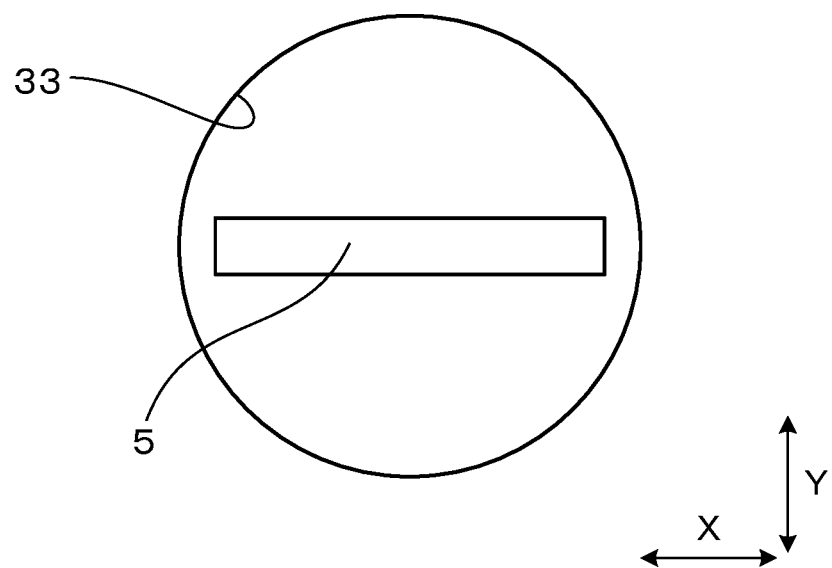
FIG. 4 is an arrow view viewed in the direction of the arrow IV in FIG. 3.

As shown in FIG. 3 and FIG. 4, the magnetism sensing direction of the magnetic sensor 5 is the same as the axial direction. The magnetic sensor 5 is located on the inside than an intermediate position M between an exterior surface 31 and an interior surface 32 of the housing 3 in the radial direction.

Figure 5:
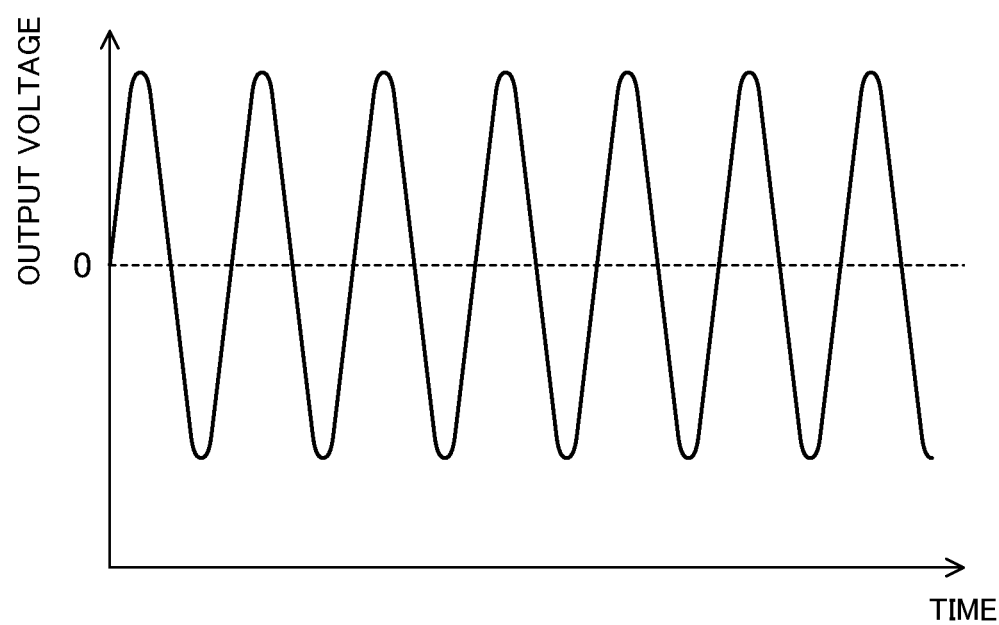
FIG. 5 shows an output waveform of a magnetic sensor according to Embodiment 1.

When the rotor 2 rotates, the magnet 4 also rotates. Thus, the magnetic field that is generated from the magnet 4 and acts on the housing 3 varies with time. Accordingly, as shown in FIG. 5, the output of the magnetic sensor 5 varies with time. It is configured to detect the rotation speed of the rotor 2 using the time variation of the output. In the present embodiment, detected values of the rotation speed are transmitted to an ECU that is not shown in the figure. The ECU uses the detected values to control the engine.

Figure 6:
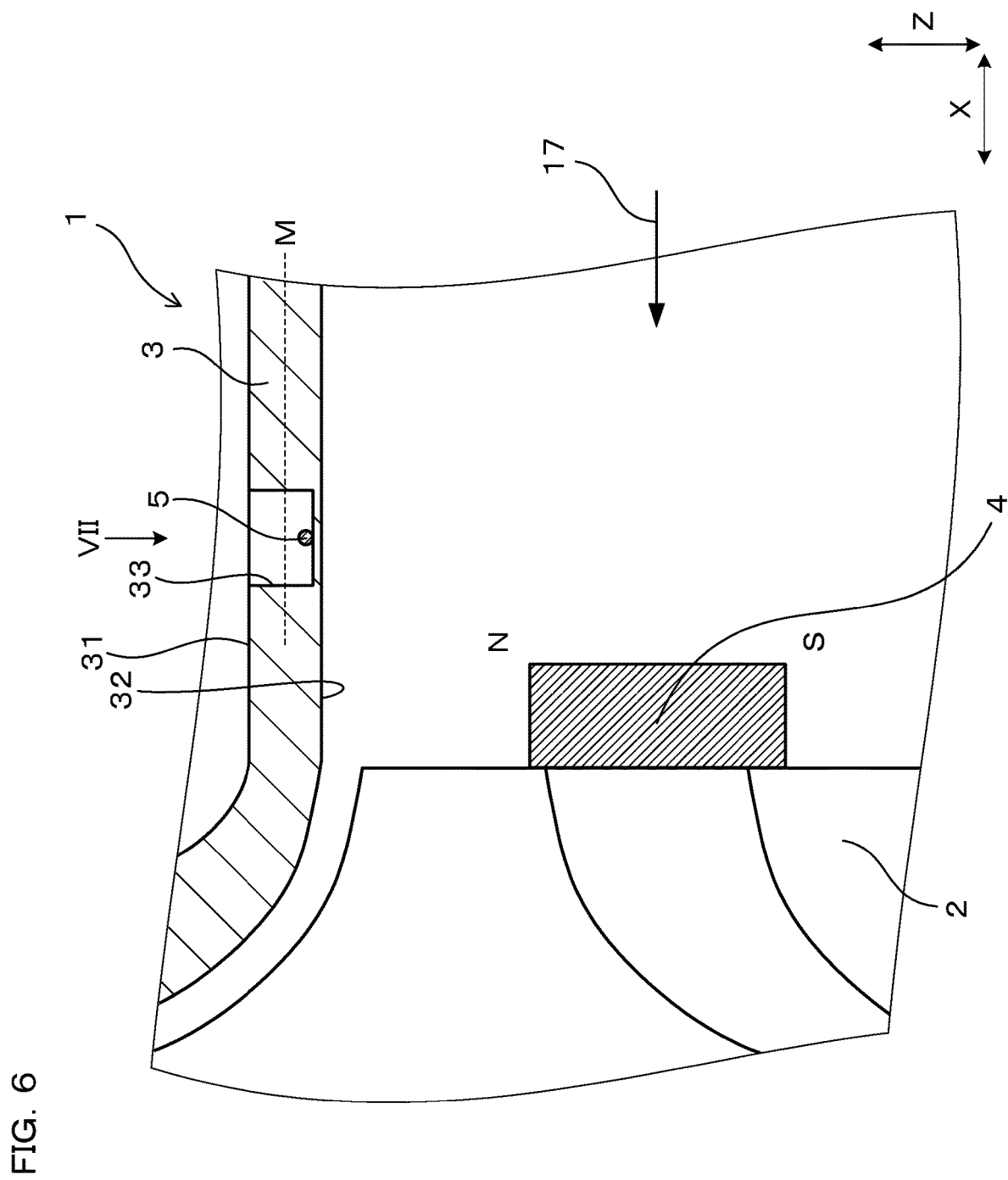
FIG. 6 is a cross-sectional view of the rotary machine according to Embodiment 1, in which the magnetism sensing direction of the magnetic sensor is in Y direction.
Figure 7:
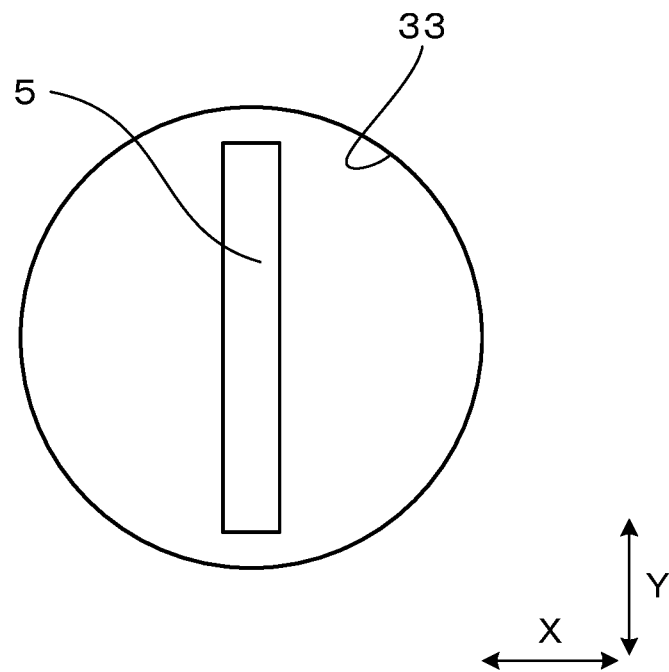
FIG. 7 is an arrow view viewed in the direction of the arrow VII in FIG. 6.
Figure 8:
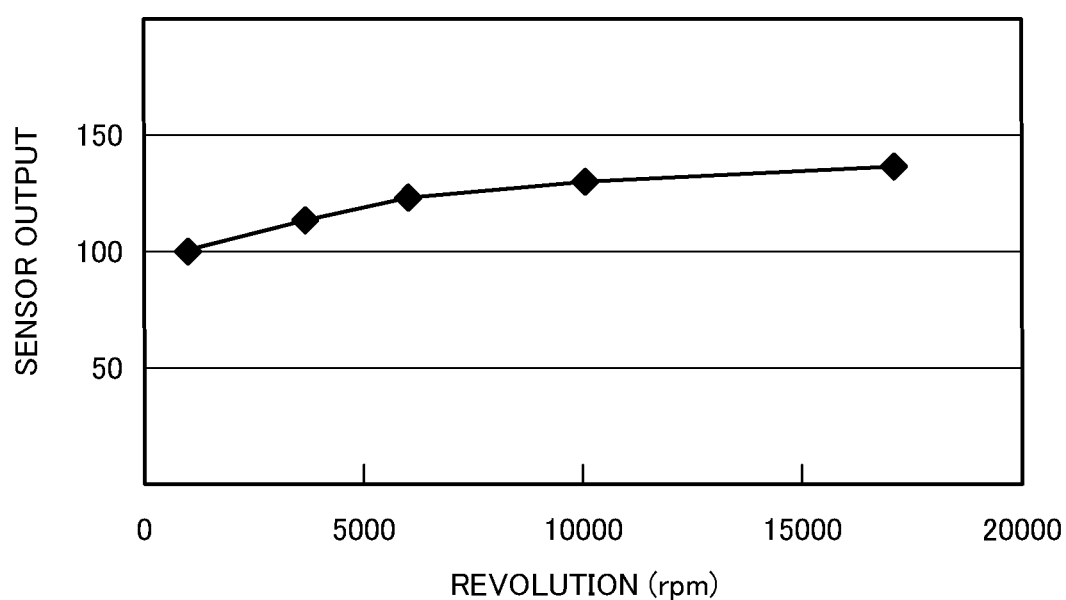
FIG. 8 is a graph showing the relation between the amplitude of output of the magnetic sensor shown in FIG. 3 and the revolution of the rotor.
Figure 9:
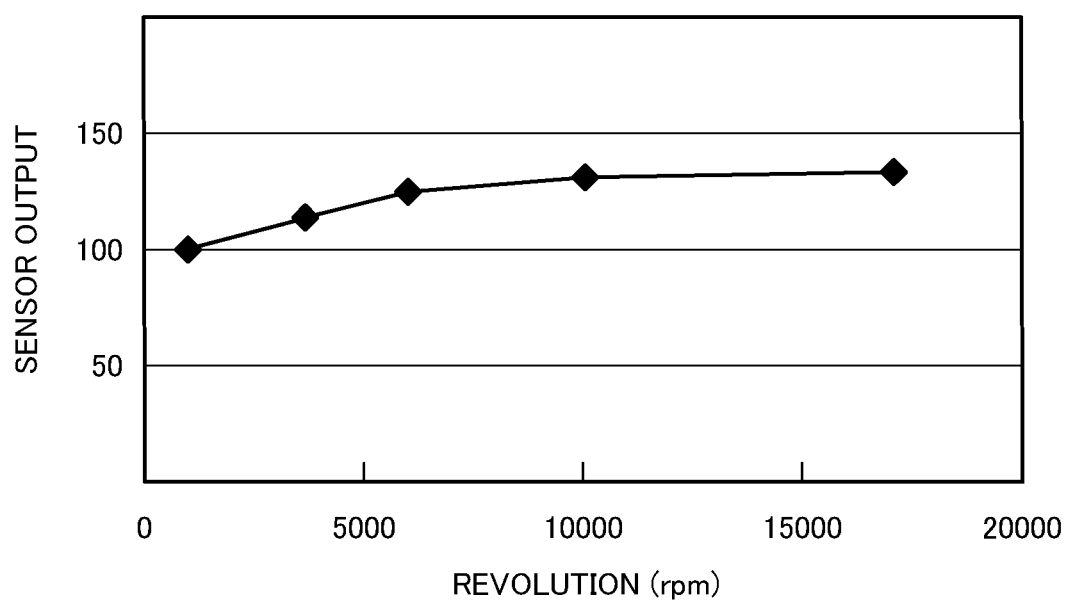
FIG. 9 is a graph showing the relation between the amplitude of output of the magnetic sensor shown in FIG. 6 and the revolution of the rotor.
Figure 24:
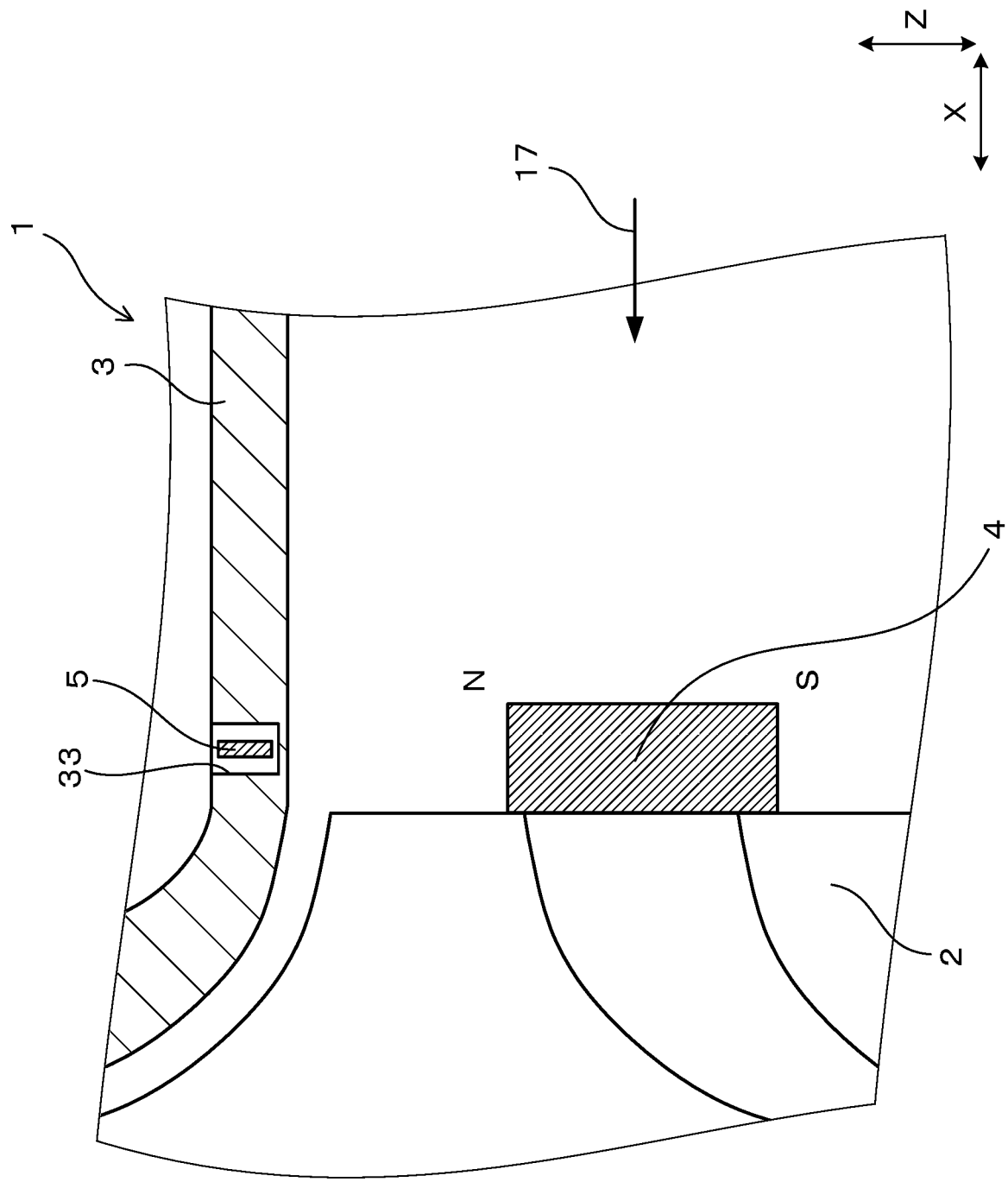
FIG. 24 is a cross-sectional view of a rotary machine according to Comparative Embodiment 1.
Figure 25:
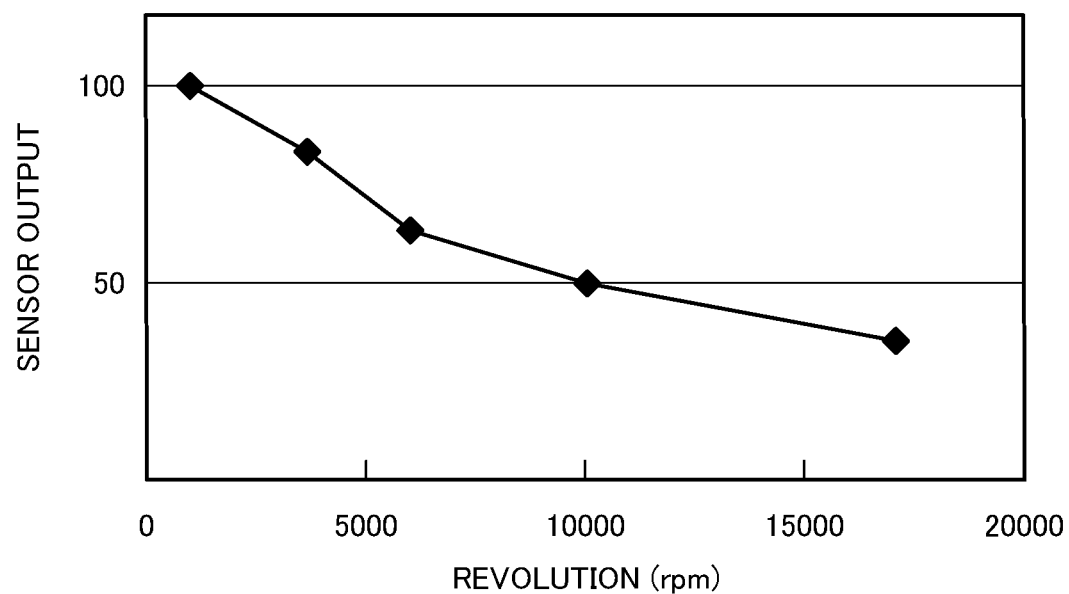
FIG. 25 is a graph showing the relation between the amplitude of output of the magnetic sensor shown in FIG. 24 and the revolution of the rotor.

Experiments to confirm the effects of the present embodiment were conducted. Firstly, the rotary machine 1 shown in FIG. 1 to FIG. 3 was prepared as sample 1 that falls within the scope of the present invention. Further, as shown in FIG. 6 and FIG. 7, the rotary machine 1 in which the magnetism sensing direction of the magnetic sensor 5 is in the direction (Y direction) that is orthogonal to both of the axial direction (X direction) and the opening direction of the recessed part 33 (Z direction) was prepared as sample 2 that falls within the scope of the present invention. Still further, as shown in FIG. 24, the rotary machine 1 in which the magnetism sensing direction of the magnetic sensor 5 is in the radial direction (Z direction) was prepared as a comparative sample that departs from the scope of the present invention. In the comparative sample, the magnetic sensor 5 was arranged at the position adjacent to the magnet 4 in the radial direction. Each rotor 2 of these samples is rotated to reach 1000 to 17000 rpm to measure the amplitude of the output voltage of the magnetic sensor 5. Then, the relation between the revolution of the rotor 2 and the amplitude of the output voltage was graphed. The results are shown in FIG. 8, FIG. 9 and FIG. 25. It is noted that in these graphs, the output of the magnetic sensor 5 (ordinate) is indicated by the ratio of indices when setting the magnitude of the output at 1000 rpm as 100.

FIG. 8 shows the measurement result of sample 1, and FIG. 9 shows the measurement result of sample 2. FIG. 25 shows the measurement result of the comparative sample. From FIG. 8 and FIG. 9, it is found that in each of samples 1 and 2 that fall within the scope of the present invention, the output of the magnetic sensor 5 gradually increases as the revolution of the rotor 2 increases. In contrast, as shown in FIG. 25, the comparative sample shows that the output of the magnetic sensor 5 gradually decreases as the revolution of the rotor 2 increases.

Operational effects of the present invention will be explained. As shown in FIG. 3 and FIG. 6, in the present embodiment, the magnet 4 is attached to the rotor 2 such that the arrangement direction of a pair of magnetic poles is the same as the radial direction of the rotor. And, the magnetic sensor 5 is attached to the housing 3. The magnetism sensing direction of the magnetic sensor 5 is made orthogonal to the radial direction of the rotor.

According to such a configuration, as shown in FIG. 8 and FIG. 9, even if the rotation speed of the rotor 2 becomes high, the output of the magnetic sensor 5 is hardly lowered, and instead the output can be made higher. This is considered, by the assumption, because the magnetic field of the magnet 4 and the magnetic field caused by the eddy current generated in the housing 3 are not cancelled out each other in the direction orthogonal to the radial direction, and rather intensify each other with being directed in the same direction. Therefore, it can be considered that the output of the magnetic sensor 5 becomes high as the rotation speed of the magnet 4 becomes high and the eddy current generate more largely in the housing 3. For this reason, when the magnetic sensor 5 is arranged such that the magnetism sensing direction is orthogonal to the radial direction as in the present embodiment, the output of the magnetic sensor 5 can remain at a high level even if the rotation speed of the rotor 2 becomes high, which makes it possible to accurately detect the rotation speed of the rotor 2.

Further, as shown in FIG. 3, the magnetic sensor 5 of the present embodiment is arranged at a position apart from the magnet 4 by the prescribed distance L in an axial direction (X direction) of the rotor 2.

As shown in FIG. 3, part of a magnetic field H generated from the magnet 4 flows inside the housing 3 in the direction orthogonal to the radial direction at the position apart from the magnet 4 in the axial direction. Therefore, when the magnetic sensor 5 is arranged at the position apart from the magnet 4 by the prescribed distance L in the axial direction, the intensity of the magnetic field H of the magnet 4, which acts on the magnetic sensor 5 in the magnetism sensing direction, can be enhanced. Thus, the output of the magnetic sensor 5 can be increased, accordingly the rotation speed of the rotor 2 can be detected accurately.

Further, as shown in FIG. 3, the magnetic sensor 5 of the present embodiment is located on the inside than the intermediate position M between the exterior surface 31 and the interior surface 32 of the housing 3 in the radial direction.

According to such a configuration, the magnetic sensor 5 can be closer to the magnet 4. Thus, the output of the magnetic sensor 5 can be increased. Consequently, the rotation speed of the rotor 2 can be detected more accurately.

Still further, as shown in FIG. 3, the housing 3 of the present embodiment has a recessed part 33 recessively formed inward in the radial direction from the exterior surface 31. And the magnetic sensor 5 is arranged in the recessed part 33.

Therefore, when manufacturing the rotary machine 1, the magnetic sensor 5 can be easily disposed inside the housing 3 from the outside of the housing 3. In this way, it becomes possible to readily manufacture the rotary machine 1. In addition, when the magnetic sensor 5 is disposed in the recessed part 33, the magnetic sensor 5 can be made close to the magnet 4. Therefore, the output of the magnetic sensor 5 can be increased to thereby detect the rotation speed of the rotor 2 accurately.

Still further, as shown in FIG. 1, the rotary machine 1 of the present embodiment is used as a turbocharger 1a. The rotor 2 is a compressor wheel 2a of the turbocharger 1a, the housing 3 is a compressor housing 3a for housing the compressor wheel 2a. The magnetic sensor 5 is attached to the compressor housing 3a.

Thus, it becomes possible to measure the rotation speed of the compressor wheel 2a accurately. In addition, because the compressor housing 3a is an intake side housing 3 of a turbocharger 1a, the temperature is lower than that of a turbo housing 12 that is an exhaust side housing. Therefore, by attaching the magnetic sensor 5 to the compressor housing 3a, the magnetic sensor 5 can be prevented from having a high temperature to thereby prevent shortening of the life of the magnetic sensor 5.

Still further, the magnetic sensor 5 of the present embodiment is an MI sensor.

An MI sensor is excellent both in sensitivity for detecting magnetism and response speed. Therefore, even in the case of high-speed rotation exceeding 10000 rpm, by using an MI sensor, time variation of the magnetic field of the magnet 4 can be accurately detected, so that the rotation speed of the rotor 2 can be accurately detected.

Still further, as shown in FIG. 1, the magnet 4 of the present embodiment is attached such that the center coincides with the rotation axis A of the rotor 2.

When the magnet 4 is attached to the rotation axis A in such a manner, the magnet 4 is hardly affected by a centrifugal force accompanied with the rotation of the rotor 2. Accordingly, any failure, for example, dropping of the magnet 4 by the centrifugal force, etc. can be prevented.

As mentioned above, the present embodiment can provide a rotary machine in which the output of the magnetic sensor is hardly lowered even if the rotation speed of the rotor becomes high.

It is noted that the rotary machine 1 of the present embodiment is the turbocharger 1a, however, the present invention is not limited thereto. For example, the rotary machine 1 can also be applied to some other type of turbo, air motor, and the like. In addition, in the present embodiment, the magnetism sensing direction of the magnetic sensor 5 is in the axial direction of the rotor 2 (X direction: refer to FIG. 3) or Y direction (refer to FIG. 6), however, the present invention is not limited to this. As long as the magnetism sensing direction is orthogonal to the radial direction, the same effects can be obtained even when the magnetism sensing direction is in the direction between X direction and Y direction.

Still further, the present embodiment uses the magnet 4 equipped with a pair of magnetic poles, however, the present invention is not limited to this configuration. In other words, the magnet 4 equipped with two or more pair of magnetic poles can be used. Accordingly, the magnet 4 can be attached to the rotor 2 such that each of plural pairs of magnetic poles is in the radial direction.

In the following embodiments, the reference numbers which are used in the figures and are the same as were used in Embodiment 1 indicate the same structural elements, etc. as were used in Embodiment 1, except as otherwise shown.

Embodiment 2

Figure 10:
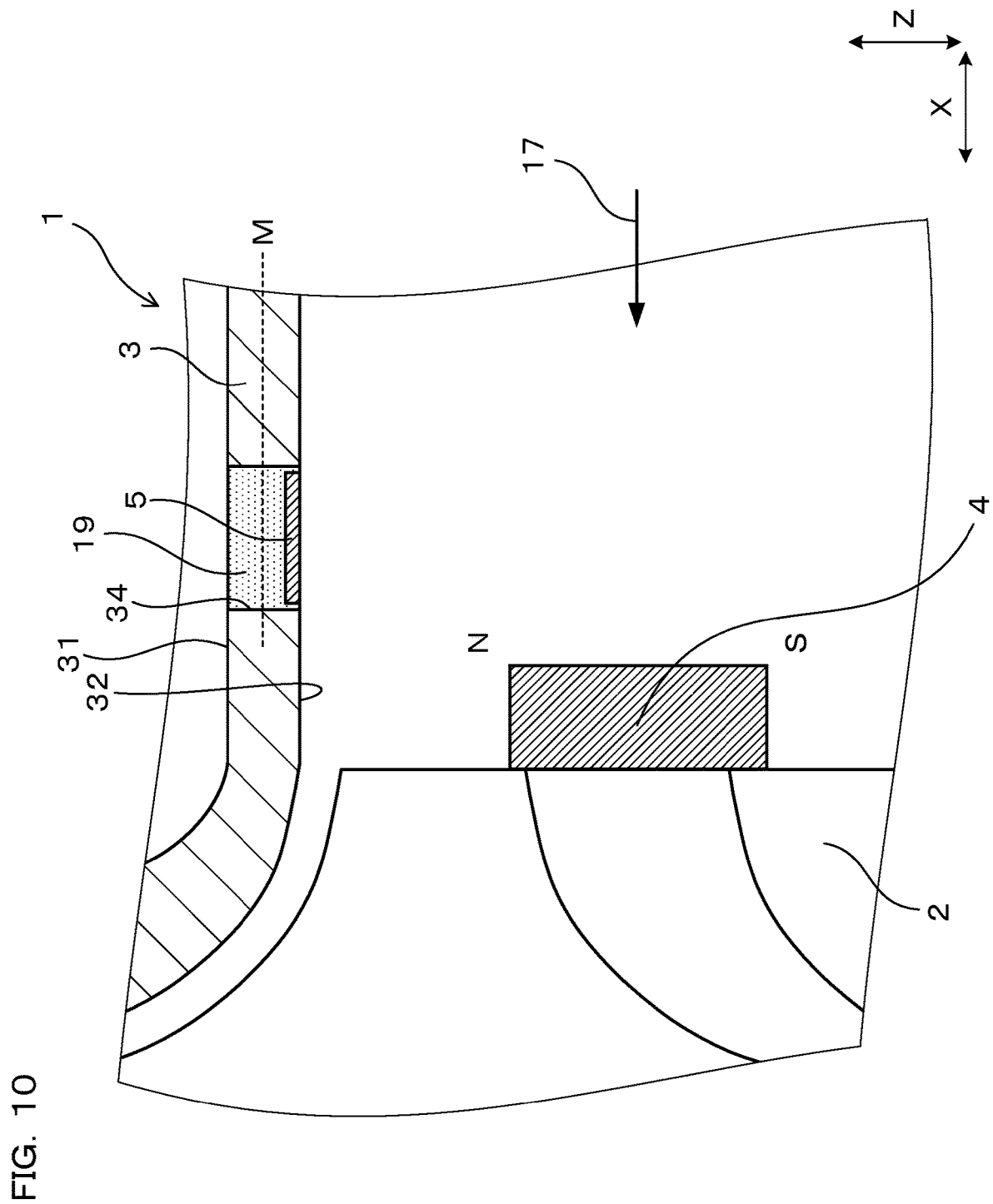
FIG. 10 is a cross-sectional view of a rotary machine according to Embodiment 2.

The present embodiment is an example in which the shape of the housing 3 is modified. As shown in FIG. 10, in the present embodiment, the housing 3 has a through hole 34 formed passing therethrough in the radial direction. And, the magnetic sensor 5 is disposed inside this through hole 34 and is sealed therein by a sealing member 19 such as an epoxy resin, a ceramic adhesive, and the like.

In the present embodiment, the magnetic sensor 5 is disposed such that the magnetism sensing direction of the magnetic sensor 5 is in the axial direction (X direction) of the rotor 2, in the same way as in Embodiment 1. Further, the magnetic sensor 5 is located on the inside than an intermediate position M between the exterior surface 31 and the interior surface 32 of the housing 3 in the radial direction.

In addition, the present embodiment has the same configurations and operational effects as those in Embodiment 1.

Embodiment 3

Figure 11:
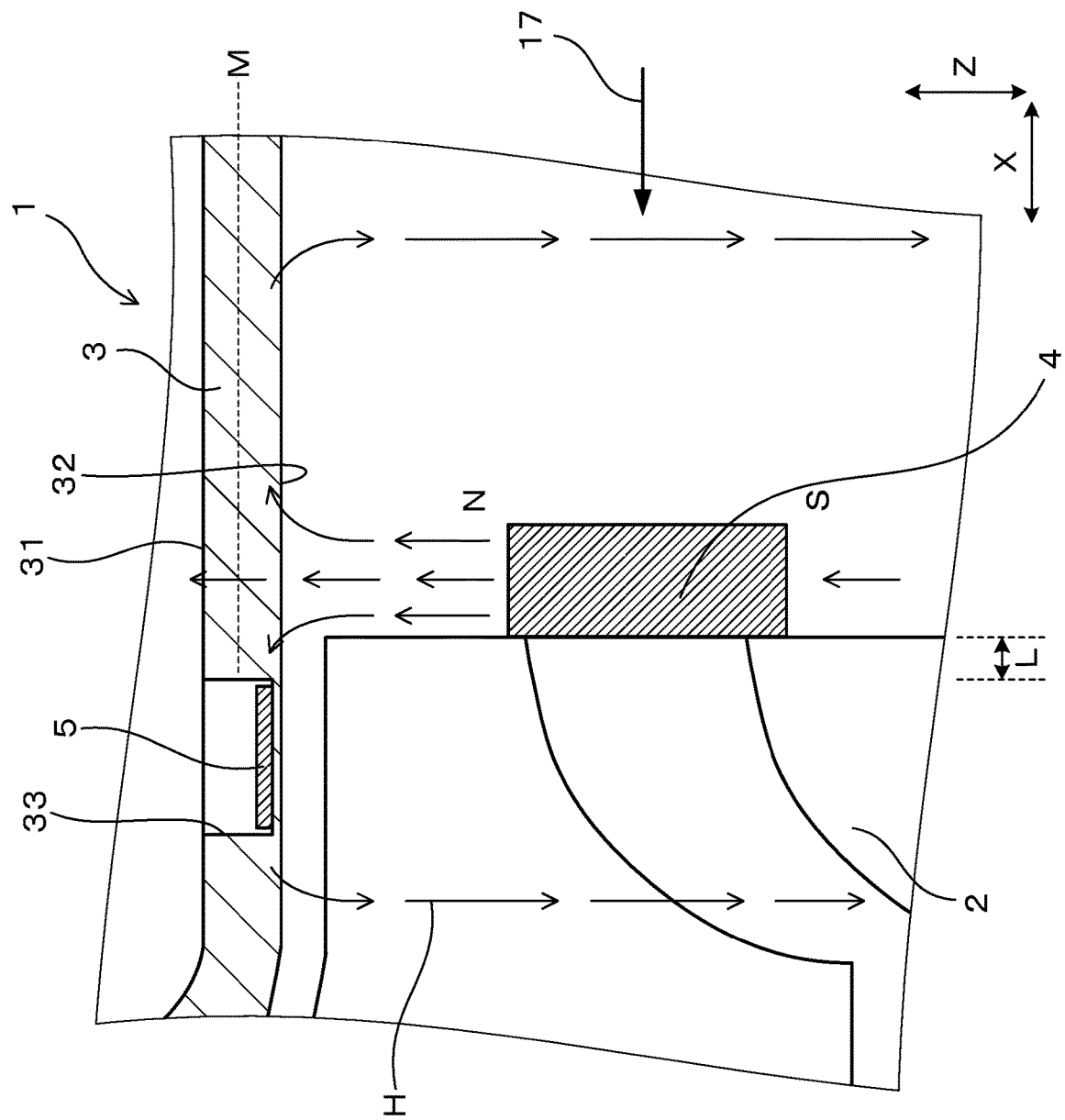
FIG. 11 is a cross-sectional view of a rotor according to Embodiment 3.

The present embodiment is an example in which the arrangement position of the magnetic sensor 5 is modified. As shown in FIG. 11, in the present embodiment, the magnetic sensor 5 is arranged at a position apart from the magnet 4 by a predetermined distance L in the axial direction (X direction) in the same way as in Embodiment 1. The magnetic sensor 5 is located on the side closer to the rotor 2 than the magnet 4 in the X direction.

In addition, the housing 3 has the recessed part 33 formed therein. The magnetic sensor 5 is disposed in the recessed part 33. The magnetic sensor 5 is located on the inside than the intermediate position M between the exterior surface 31 and the interior surface 32 of the housing 3 in the radial direction.

Also in the case configured as mentioned above, it becomes easy for the magnetic field H of the magnet 4 to act on the magnetic sensor 5 in the magnetism sensing direction in the same way as in Embodiment 1. Therefore, the output of the magnetic sensor 5 can be increased.

In addition, the present embodiment has the same configurations and operational effects as those in Embodiment 1.

Embodiment 4

Figure 12:
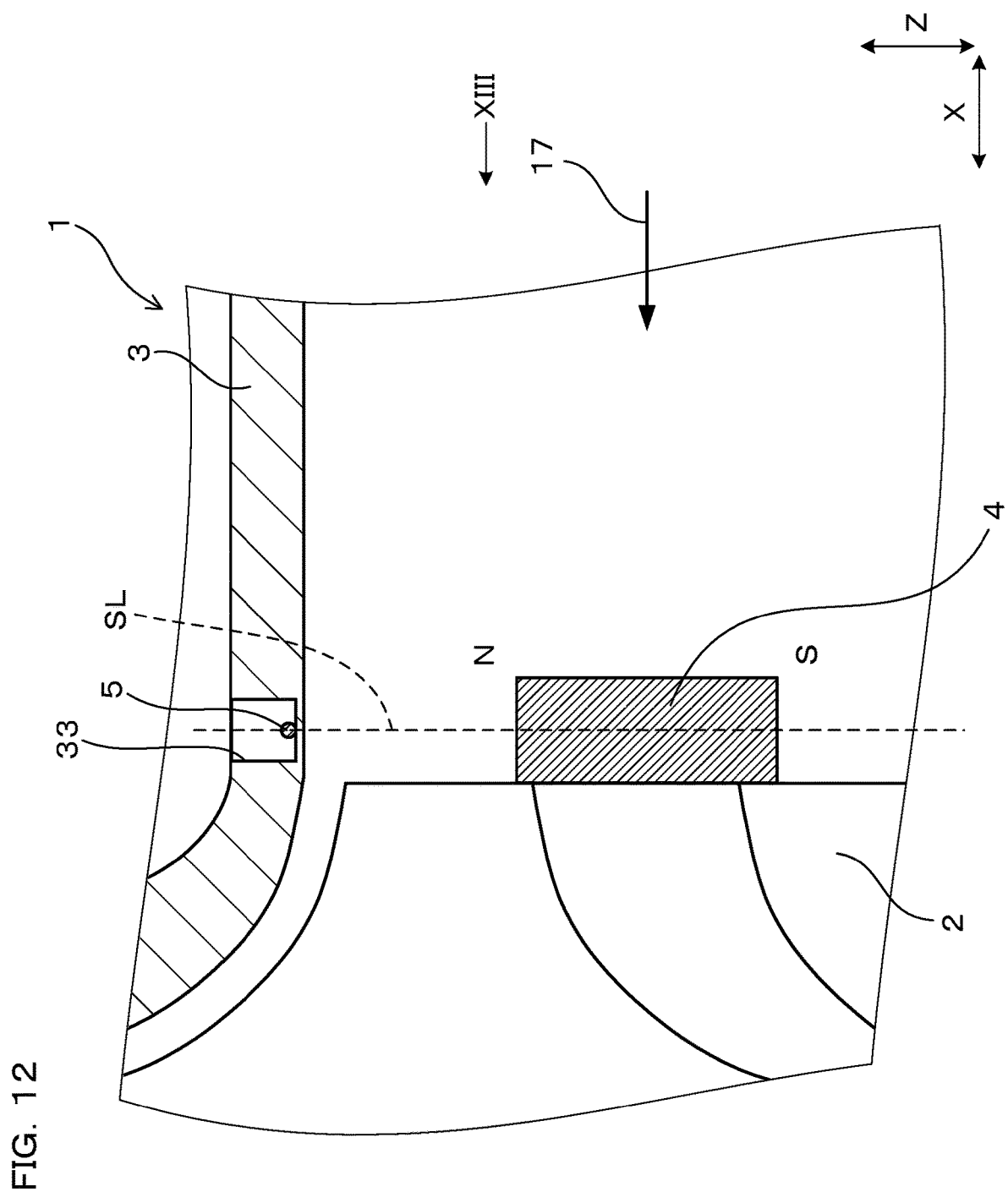
FIG. 12 is a cross-sectional view of a rotor according to Embodiment 4, taken along the line XII-XII in FIG. 13.
Figure 13:
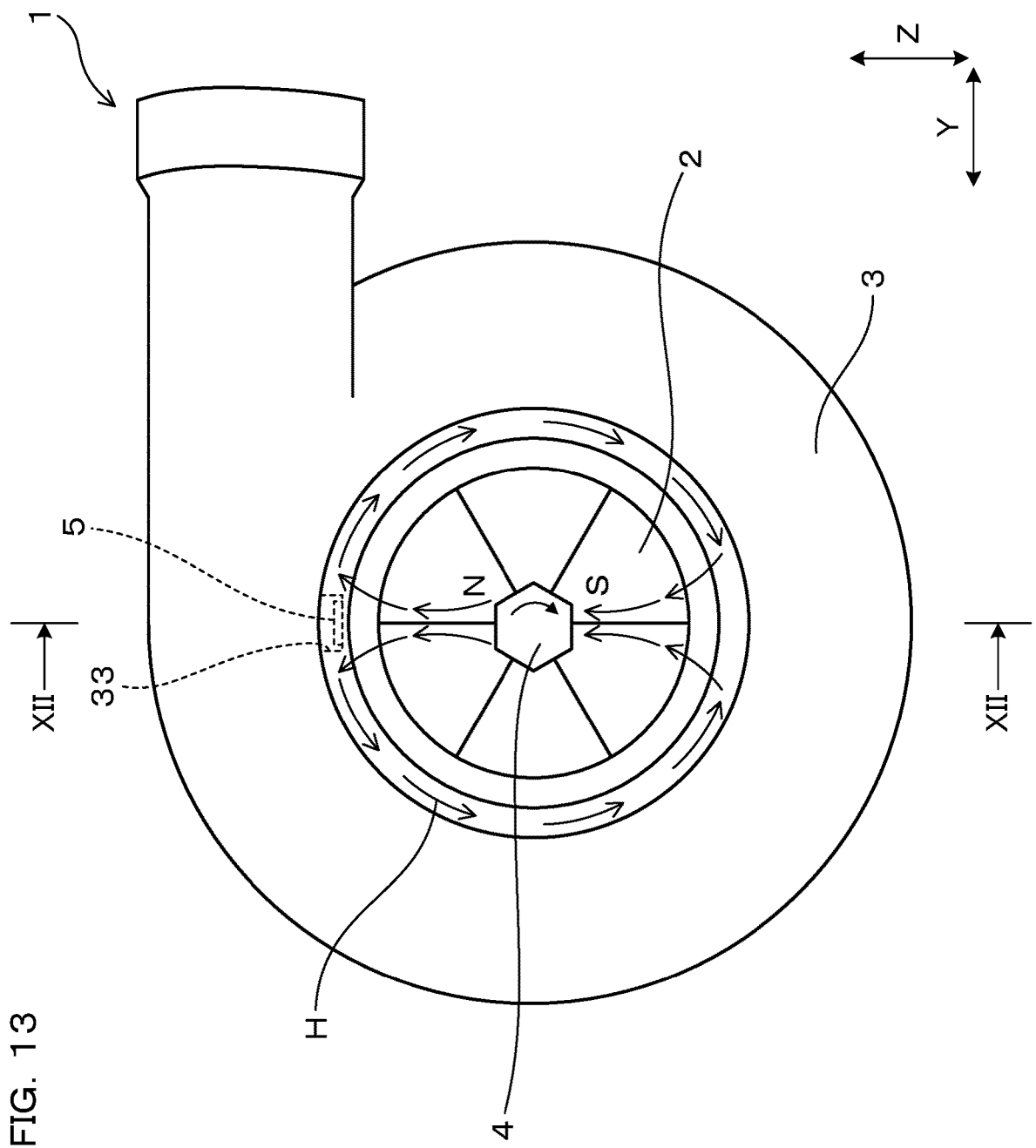
FIG. 13 is an arrow view viewed in the direction of the arrow XIII in FIG. 12.

The present embodiment is an example in which the arrangement position of the magnetic sensor 5 is modified. As shown in FIG. 12 and FIG. 13, in the present embodiment, the magnetic sensor 5 is arranged at the position adjacent to the magnet 4 in the radial direction (the position where the center of the magnetic sensor 5 is located on the straight line SL drawn in the radial direction passing through the magnet 4). The magnetic sensor 5 is arranged such that the magnetism sensing direction is in the Y direction.

As shown in FIG. 13, part of the magnetic field H generated from the magnet 4 acts on the magnetic sensor 5 in the Y direction, that is, in the magnetism sensing direction. Thus, the output of the magnetic sensor 5 can be increased. Accordingly, it becomes possible to accurately detect time variation of the magnetic field H of the magnet 4 by the magnetic sensor 5, so that the rotation speed of the rotor 2 can be measured accurately.

Figure 26:
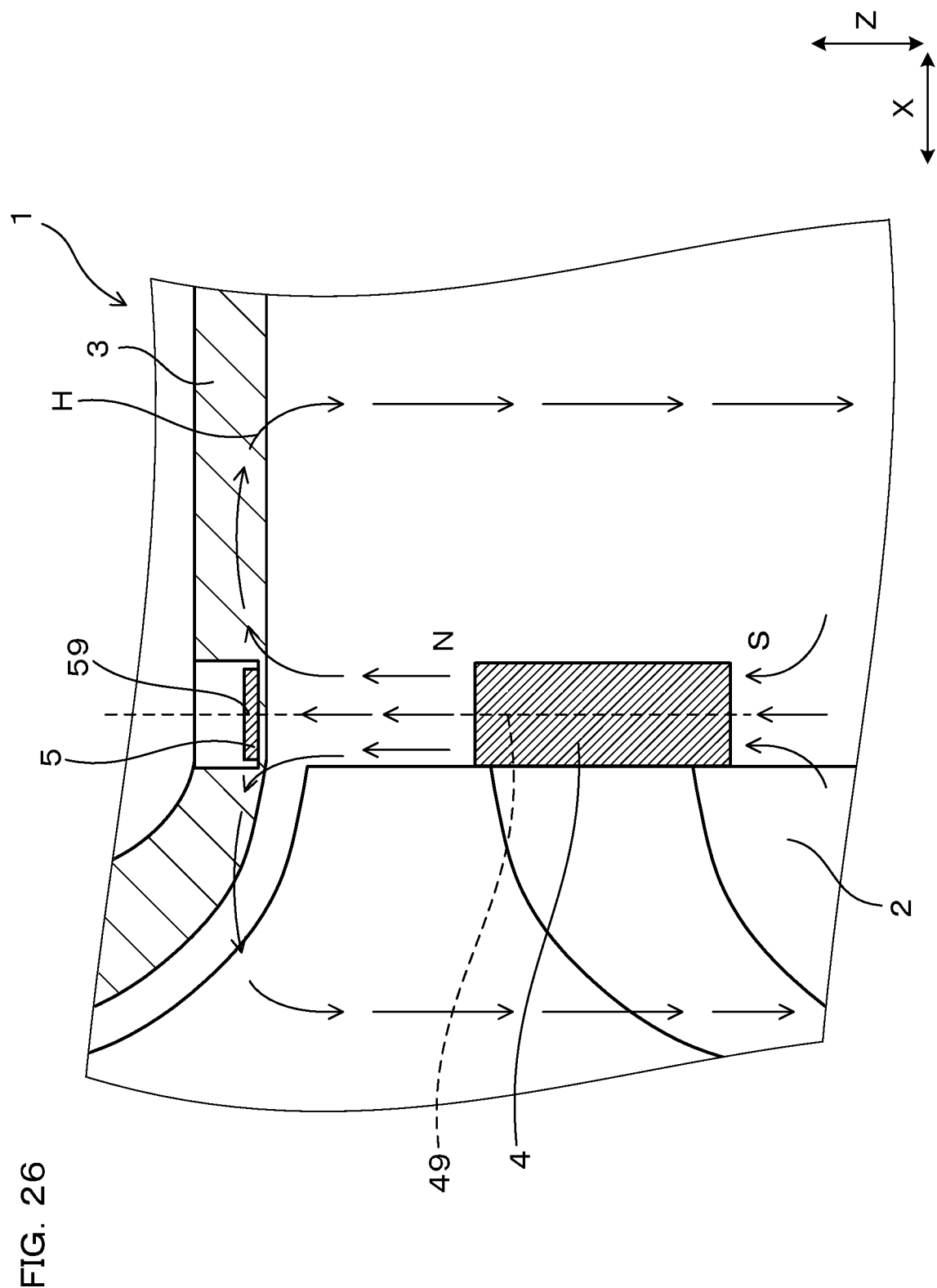
FIG. 26 is a cross-sectional view of a rotary machine according to Comparative Embodiment 2.

Here, as shown in FIG. 26, in case the magnetic sensor 5 is arranged at the position adjacent to the magnet 4 in the radial direction and the magnetism sensing direction of the magnetic sensor 5 is set in the X direction, magnetism generated from the magnet 4 acts on the center 59 of the magnetic sensor 5 with the same intensity in the left and right directions, and thus the output of the magnetic sensor 5 is lowered, which is undesirable and requires attention. In addition, the present embodiment has the same configurations and operational effects as those in Embodiment 1.

Embodiment 5

Figure 14:
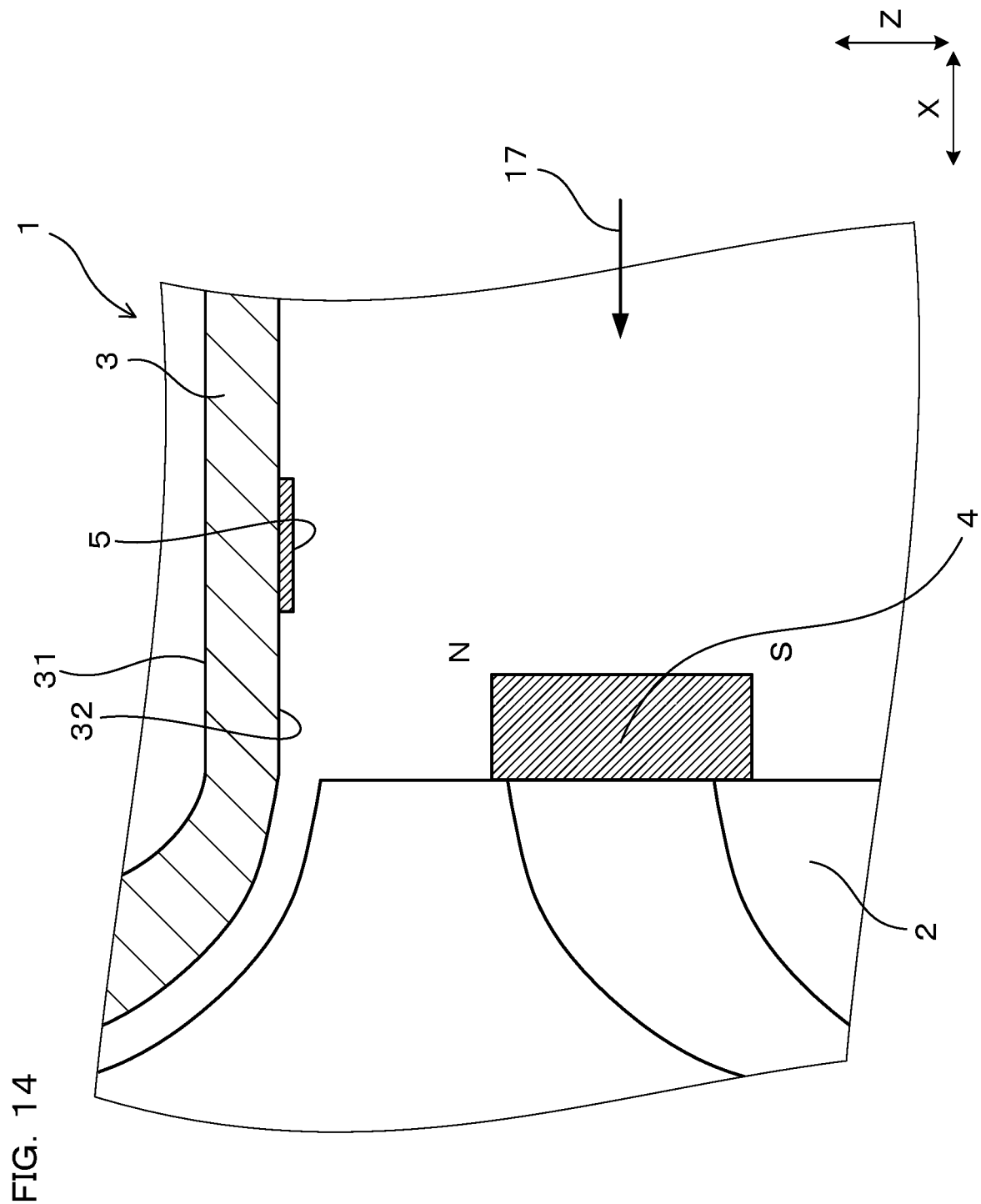
FIG. 14 is a cross-sectional view of a rotary machine according to Embodiment 5.

The present embodiment is an example in which the shape of the housing 3 and the attached position of the magnetic sensor 5 are modified. As shown in FIG. 14, in the present embodiment, the housing 3 does not have the recessed part 33 or the through hole 34 formed therein. In the present embodiment, the magnetic sensor 5 is attached to the interior surface 32 of the housing 3. It is noted that although not shown in the figure, the magnetic sensor 5 may be attached to the exterior surface 31 of the housing 3.

In addition, the present embodiment has the same configurations and operational effects as those in Embodiment 1.

Embodiment 6

Figure 15:
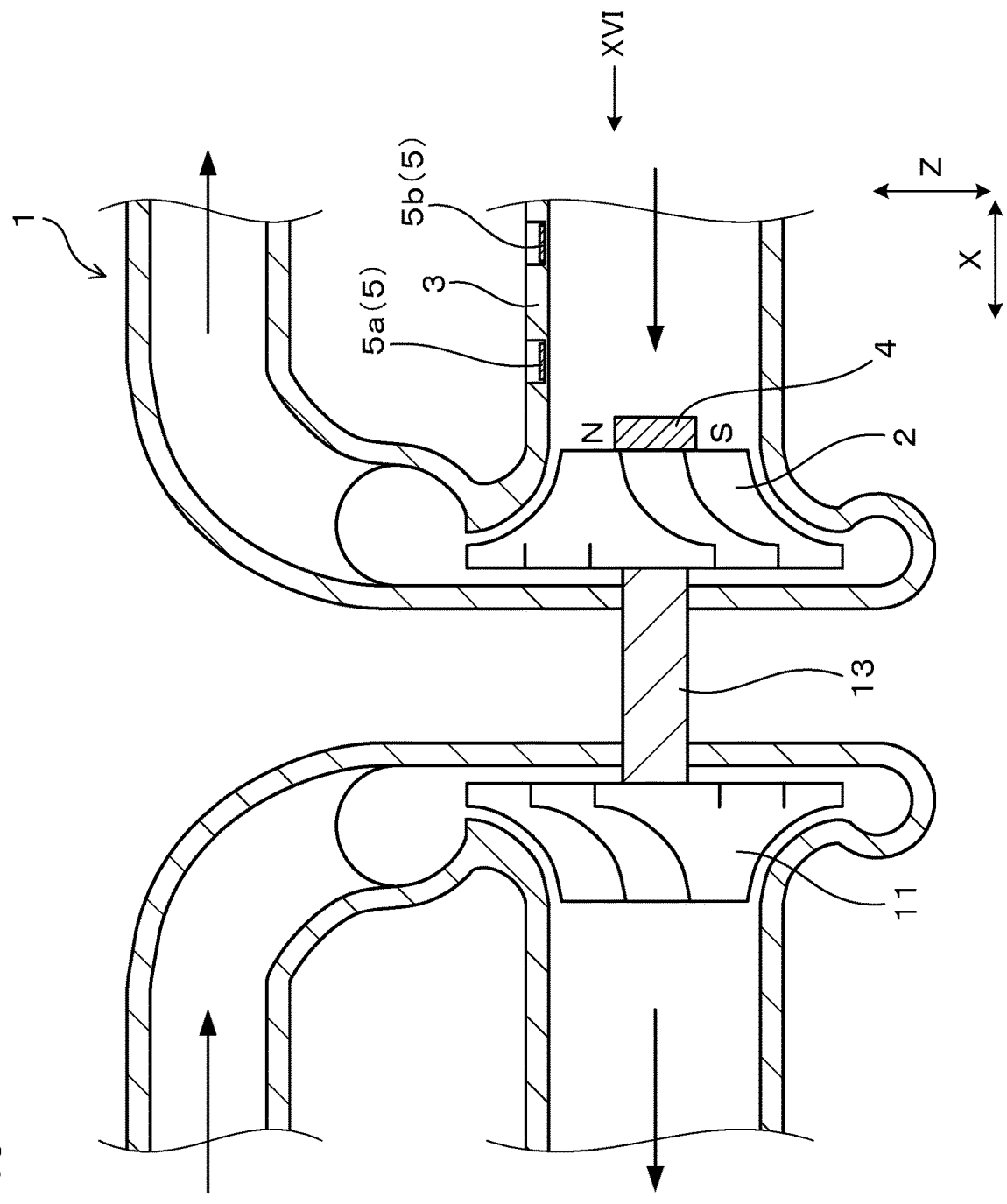
FIG. 15 is a cross-sectional view of a rotor according to Embodiment 6, taken along the line XV-XV in FIG. 16.
Figure 16:
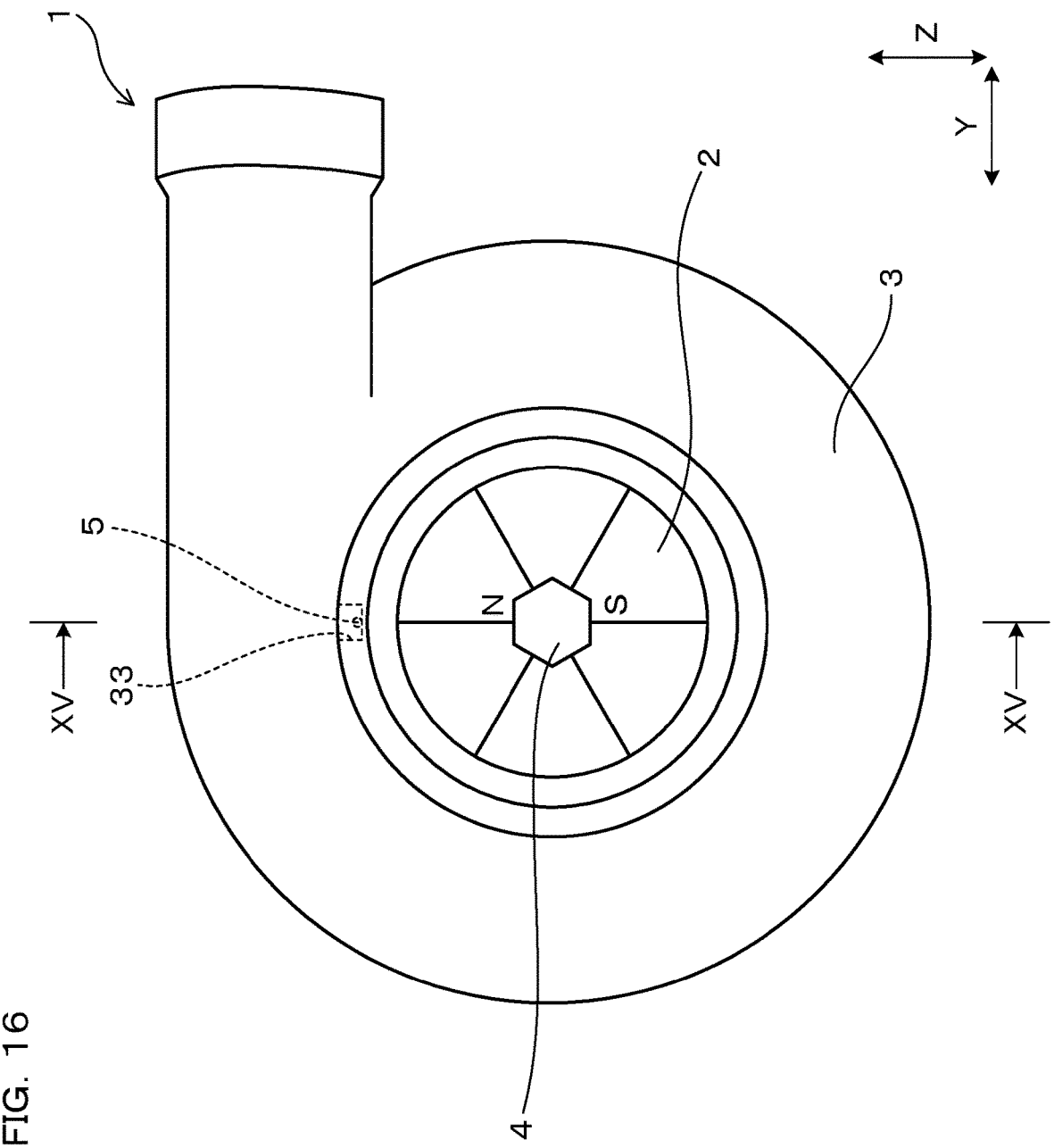
FIG. 16 is an arrow view viewed in the direction of the arrow XVI in FIG. 15.
Figure 17:
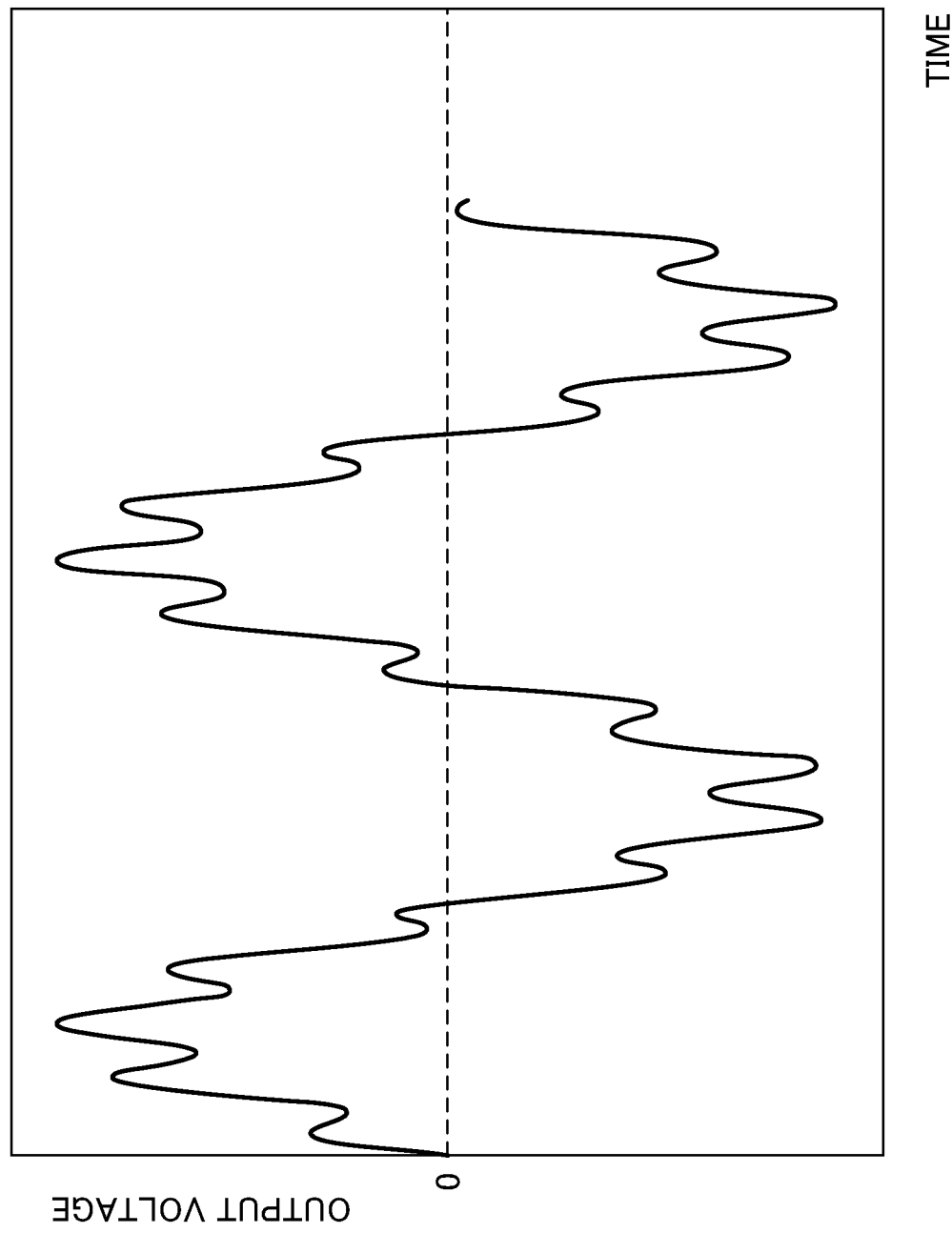
FIG. 17 shows an output waveform of a first magnetic sensor according to Embodiment 6.

The present embodiment is a modified example in which the number of the magnetic sensor 5 is changed. As shown in FIG. 15 and FIG. 16, the rotary machine 1 of the present embodiment includes two magnetic sensors 5, i.e. a first magnetic sensor 5a and a second magnetic sensor 5b. The first magnetic sensor 5a is arranged at the position closer to the magnet 4 than the second magnetic sensor 5b is. Therefore, the magnetic field H of the magnet 4 acts on the first magnetic sensor 5a more strongly than on the second magnetic sensor 5b. Accordingly, as shown in FIG. 17, the output intensity of the first magnetic sensor 5a is higher than that of the second magnetic sensor 5b (refer to FIG. 18).

Figure 18:
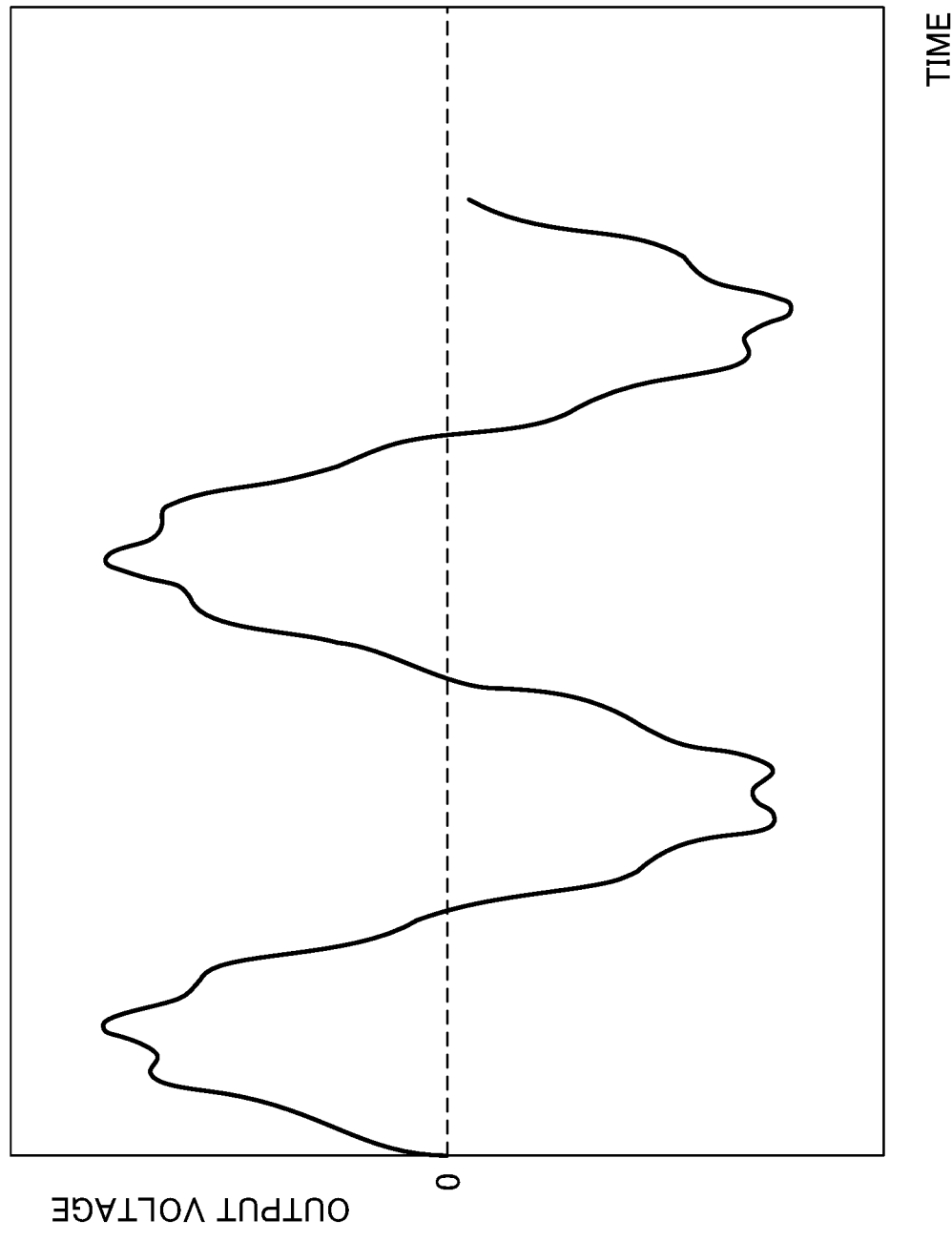
FIG. 18 shows an output waveform of a second magnetic sensor according to Embodiment 6.
Figure 19:
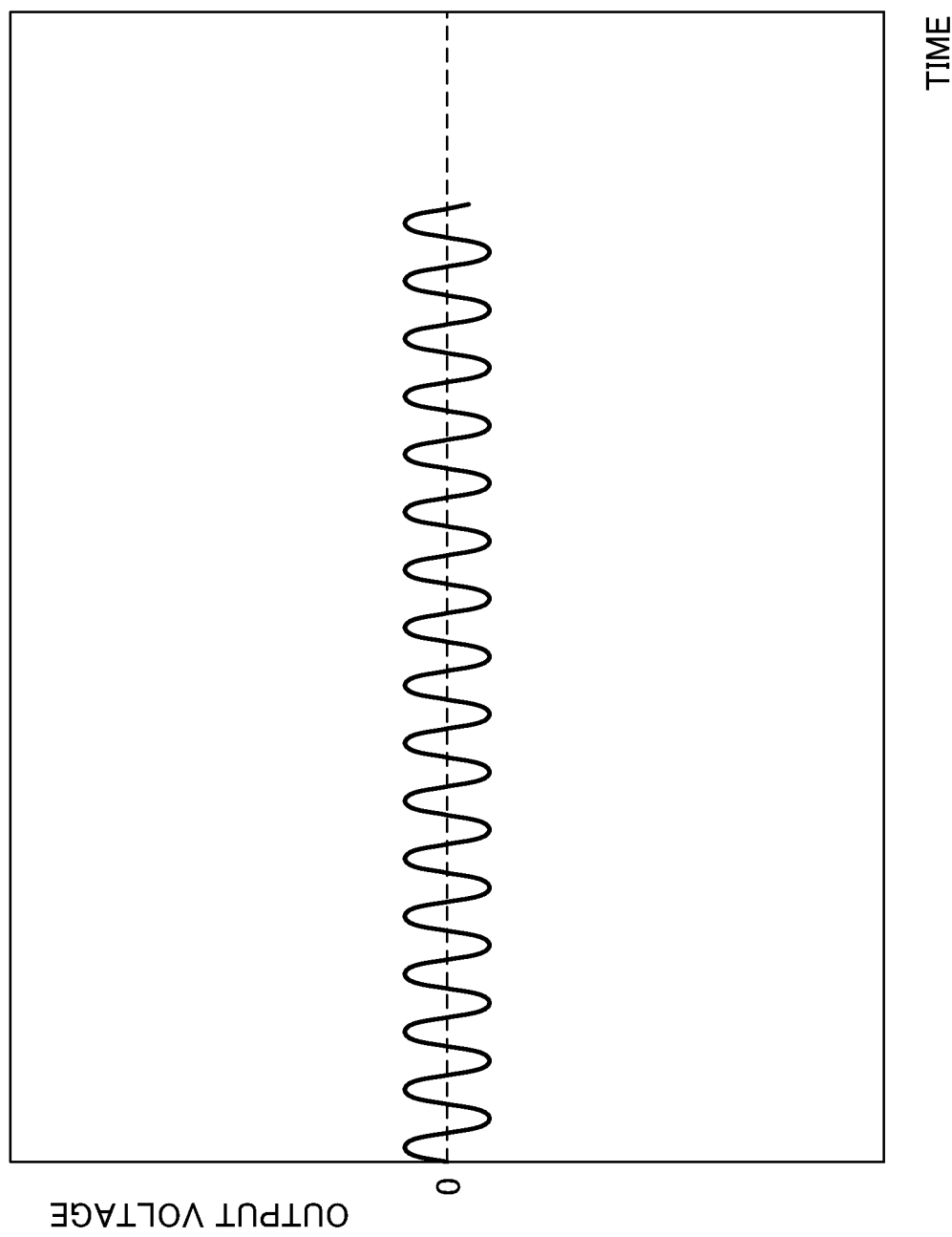
FIG. 19 shows a waveform resulting from subtraction of the output waveform of the second magnetic sensor from the output waveform of the first magnetic sensor in Embodiment 6.

In some cases, another component that generates a disturbance magnetic field is disposed around the rotary machine 1. For example, when the rotary machine 1 is applied to a turbocharger, another component that generates a disturbance magnetic field is provided inside the engine room. When the magnetic sensor 5 suffers from influence of the disturbance magnetic field, there occurs a possibility that the rotation speed of the rotor 2 cannot be measured with satisfactory accuracy. So, in the present embodiment, the disturbance magnetic field is cancelled using the two magnetic sensors 5a and 5b. Specifically, as shown in FIG. 17 and FIG. 18, an output that results from the disturbance magnetic field (noise component) is generated from each of the magnetic sensors 5a and 5b in the same way. At this time, if the two magnetic sensors 5a and 5b are arranged at the positions relatively near each other, the disturbance magnetic field acts on the two magnetic sensors 5a and 5b with the same intensity. As a result, the noise components output from the magnetic sensors 5a and 5b have nearly the same intensity. Therefore, subtracting the output of the second magnetic sensor 5b from the output of the first magnetic sensor 5a eliminates the noise components, so that the component that resulted from the magnetic field H of the magnet 4 is left as shown in FIG. 19. In the present embodiment, by using this value, the rotation speed of the rotor 2 is calculated.

Operational effects of the present embodiment will be explained. According to the abovementioned configuration, it is possible to leave the output based on the magnetic field of the magnet 4 from the outputs of the magnetic sensors 5a and 5b, which is required to detect the rotation speed, and to eliminate only the noise component based on the disturbance magnetic field. As a result, the rotation speed of the rotor 2 can be measured more accurately.

In addition, the present embodiment has the same configurations and operational effects as those in Embodiment 1.

Embodiment 7

Figure 20:
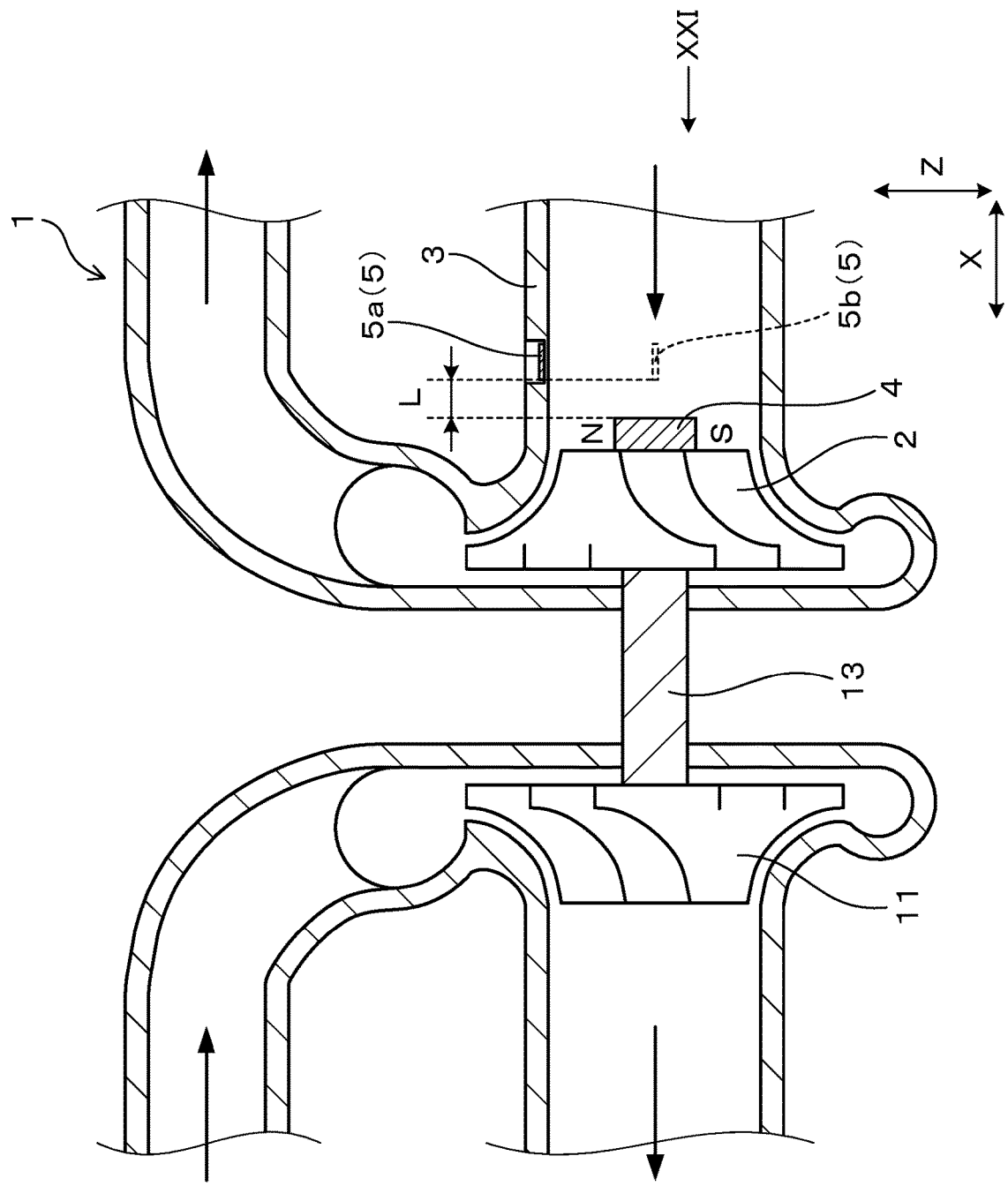
FIG. 20 is a cross-sectional view of a rotary machine according to Embodiment 7, taken along the line XX-XX in FIG. 21.
Figure 21:
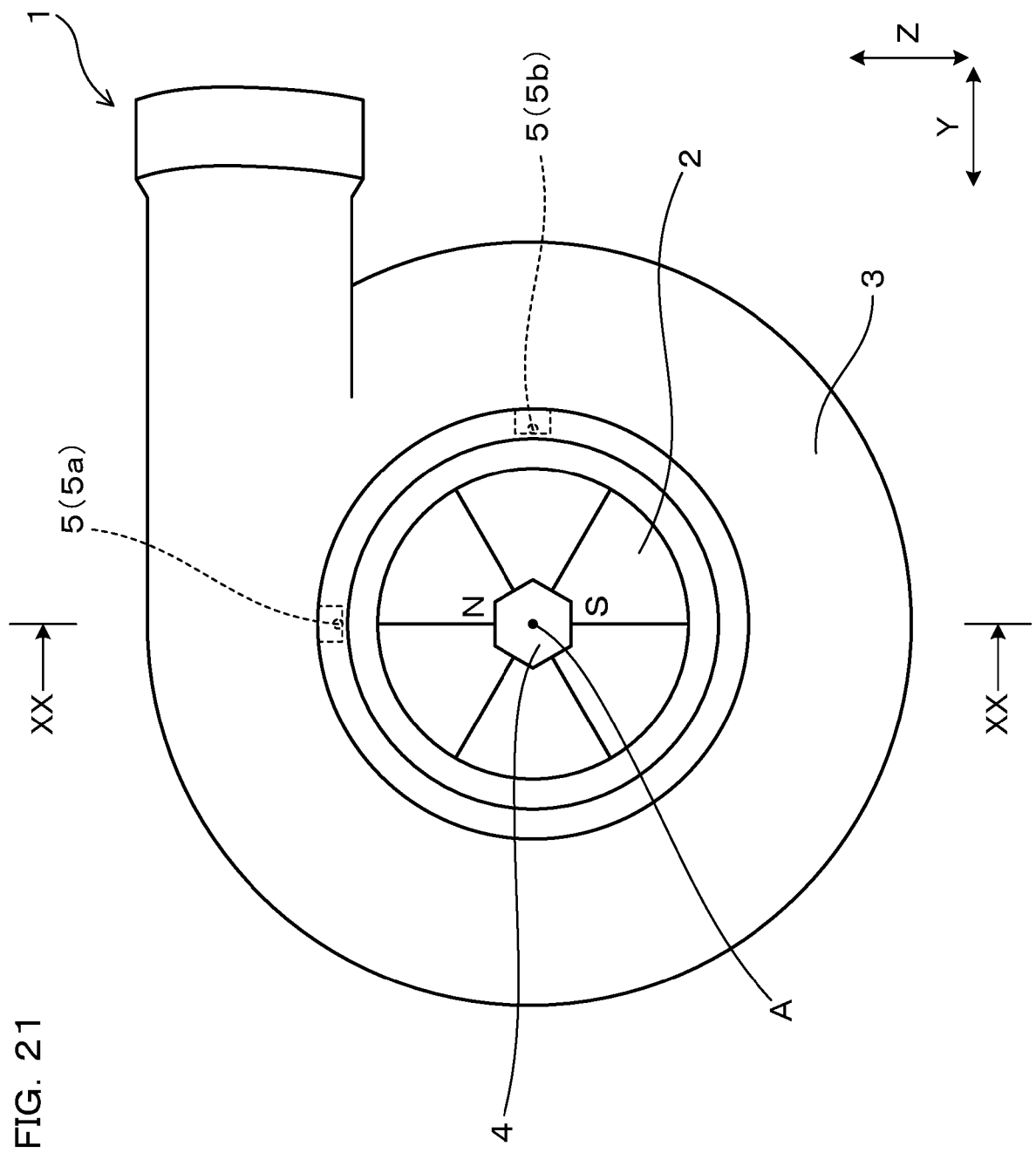
FIG. 21 is an arrow view viewed in the direction of the arrow XXI in FIG. 20.

The present embodiment is a modified example in which the arrangement positions of the two magnetic sensors 5a and 5b are changed. As shown in FIG. 21, in the present embodiment, the magnetic sensors 5a and 5b are arranged such that the first magnetic sensor 5a, the rotation axis A, and the second magnetic sensor 5b form the angle of 90° when viewed from the axial direction (X direction). And, as shown in FIG. 20, in the X direction, the distance L from each of the magnetic sensors 5a and 5b to the magnet 4 is set equal.

Thus configured, because the distance L from the magnet 4 is equal between the magnetic sensors 5a and 5b, the amplitudes of the outputs of the magnetic sensors 5a and 5b are equal to each other. However, because the phases of the outputs of the magnetic sensors 5a and 5b are different from each other, the output waveform having a certain amplitude obtained by eliminating the noise components that resulted from the disturbance magnetic field can be obtained by calculating the difference between the outputs of the two magnetic sensors 5a and 5b. By using this output waveform, the rotation speed of the rotor 2 can be accurately calculated.

In addition, the present embodiment has the same configurations and operational effects as those in Embodiment 1.

Embodiment 8

Figure 22:
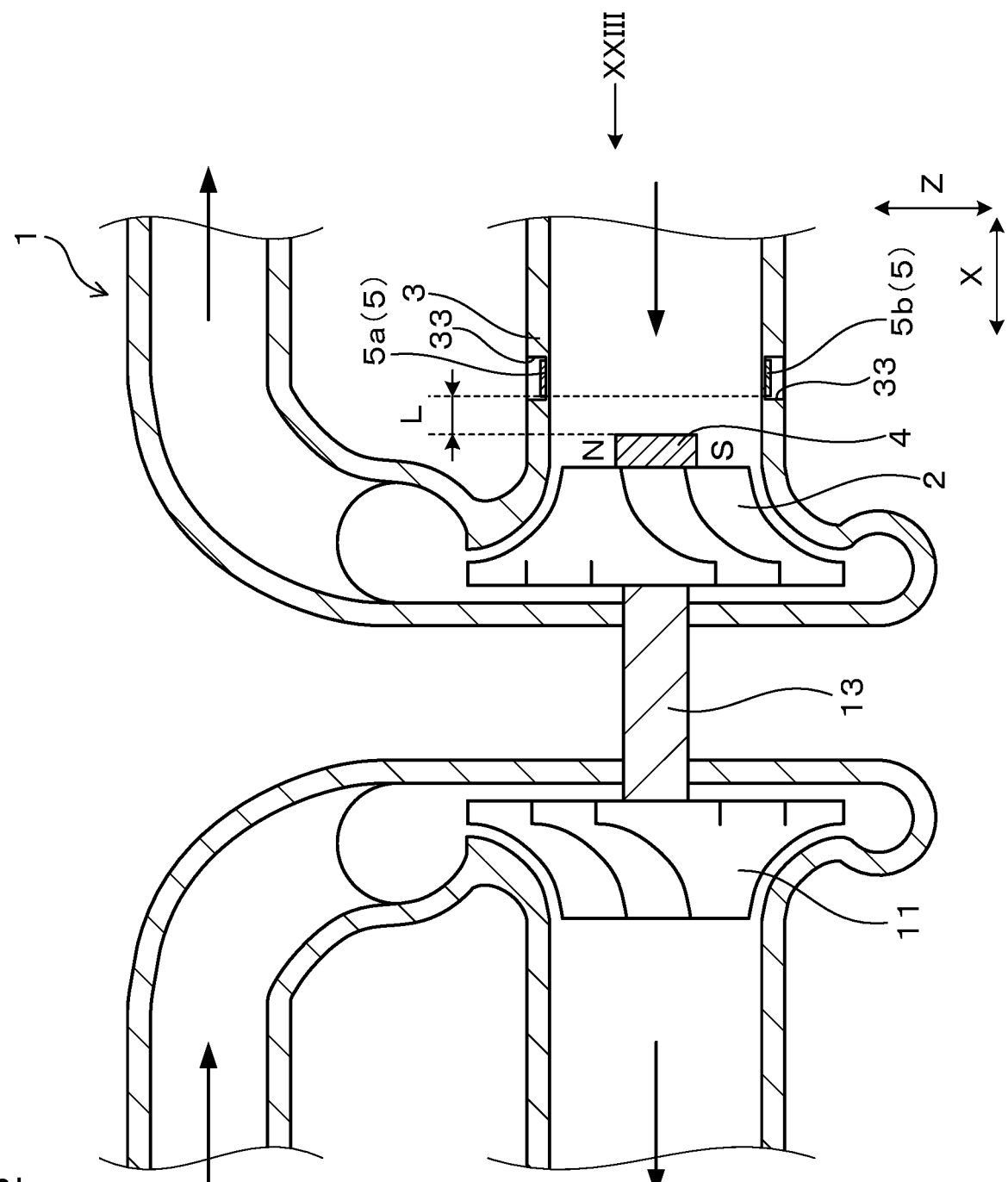
FIG. 22 is a cross-sectional view of a rotary machine according to Embodiment 8, taken along the line XXII-XXII in FIG. 23.
Figure 23:
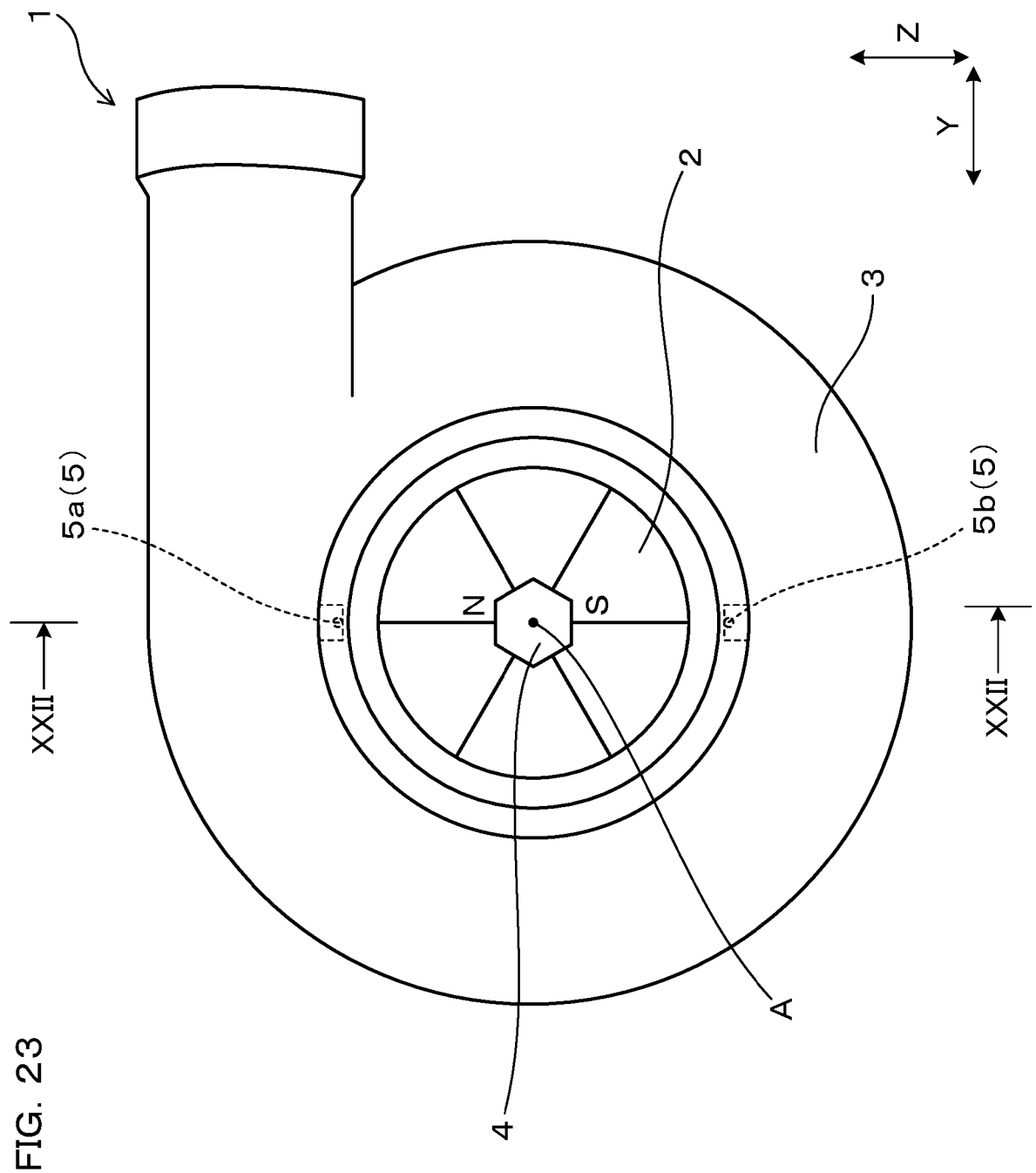
FIG. 23 is an arrow view viewed in the direction of the arrow XXIII in FIG. 22.

The present embodiment is a modified example in which the arrangement positions of the two magnetic sensors 5a and 5b are changed. As shown in FIG. 23, in the present embodiment, the magnetic sensors 5a and 5b are arranged such that the first magnetic sensor 5a, the rotation axis A, and the second magnetic sensor 5b form the angle of 180° when viewed from the axial direction (X direction). And, as shown in FIG. 22, in the X direction, the distance L from each of the magnetic sensors 5a and 5b to the magnet 4 is set equal.

Thus configured, because the distance L from the magnet 4 is equal between the magnetic sensors 5a and 5b, the amplitudes of the outputs of the magnetic sensors 5a and 5b are equal to each other. However, the phases of the outputs of the magnetic sensors 5a and 5b are deviated from each other by 180°, therefore, by calculating the difference between the outputs of the two magnetic sensors 5a and 5b, the noise components that resulted from the disturbance magnetic field can be eliminated, and at the same time the resulting output after calculation is allowed to have an amplitude twice as large as the original amplitudes of the outputs of the magnetic sensors 5a and 5b. Accordingly, it becomes possible to measure the rotation speed of the rotor 2 more accurately.

In addition, the present embodiment has the same configurations and operational effects as those in Embodiment 6.

The invention claimed is:

1. A rotary machine comprising:
a rotor configured to axially rotate around a rotation axis;
a housing formed of a conductive material and containing the rotor;
a magnet attached to the rotor such that an arrangement direction of at least a pair of magnetic poles is in a radial direction of the rotor; and
a magnetic sensor attached to the housing and configured to detect a time variation of a magnetic field generated from the magnet to thereby detect a rotation speed of the rotor,
wherein the magnetic sensor is arranged on the outside than the magnet in the radial direction, and
wherein the magnetic sensor is arranged on the outside than both sides of the magnet in the axial direction and a magnetism sensing direction of the magnetic sensor is orthogonal to the radial direction such that a magnetic field of the magnet and another magnetic field caused by an eddy current are not cancelled with each other.

2. The rotary machine according to claim 1, wherein the magnetic sensor is arranged at a position apart from the magnet by a prescribed distance in an axial direction of the rotor.

3. The rotary machine according to claim 1, wherein the magnetic sensor is located on the inside than an intermediate position between an exterior surface and an interior surface of the housing in the radial direction.

4. The rotary machine according to claim 2, wherein the magnetic sensor is located on the inside than an intermediate position between an exterior surface and an interior surface of the housing in the radial direction.

5. The rotary machine according to claim 1, wherein the housing has a recessed part recessively formed inward in the radial direction from the exterior surface of the housing, and the magnetic sensor is arranged in the recessed part.

6. The rotary machine according to claim 2, wherein the housing has a recessed part recessively formed inward in the radial direction from the exterior surface of the housing, and the magnetic sensor is arranged in the recessed part.

7. The rotary machine according to claim 3, wherein the housing has a recessed part recessively formed inward in the radial direction from the exterior surface of the housing, and the magnetic sensor is arranged in the recessed part.

8. The rotary machine according to claim 4, wherein the housing has a recessed part recessively formed inward in the radial direction from the exterior surface of the housing, and the magnetic sensor is arranged in the recessed part.

9. The rotary machine according to claim 1, wherein two or more of the magnetic sensors are provided, which differ from each other in output corresponding to the magnetic field generated from the magnet so that the difference of outputs between the two magnetic sensors is used to detect the rotation speed of the rotor.

10. The rotary machine according to claim 2, wherein two or more of the magnetic sensors are provided, which differ from each other in output corresponding to the magnetic field generated from the magnet so that the difference of outputs between the two magnetic sensors is used to detect the rotation speed of the rotor.

11. The rotary machine according to claim 3, wherein two or more of the magnetic sensors are provided, which differ from each other in output corresponding to the magnetic field generated from the magnet so that the difference of outputs between the two magnetic sensors is used to detect the rotation speed of the rotor.

12. The rotary machine according to claim 4, wherein two or more of the magnetic sensors are provided, which differ from each other in output corresponding to the magnetic field generated from the magnet so that the difference of outputs between the two magnetic sensors is used to detect the rotation speed of the rotor.

13. The rotary machine according to claim 5, wherein two or more of the magnetic sensors are provided, which differ from each other in output corresponding to the magnetic field generated from the magnet so that the difference of outputs between the two magnetic sensors is used to detect the rotation speed of the rotor.

14. The rotary machine according to claim 6, wherein two or more of the magnetic sensors are provided, which differ from each other in output corresponding to the magnetic field generated from the magnet so that the difference of outputs between the two magnetic sensors is used to detect the rotation speed of the rotor.

15. The rotary machine according to claim 7, wherein two or more of the magnetic sensors are provided, which differ from each other in output corresponding to the magnetic field generated from the magnet so that the difference of outputs between the two magnetic sensors is used to detect the rotation speed of the rotor.

16. The rotary machine according to claim 8, wherein two or more of the magnetic sensors are provided, which differ from each other in output corresponding to the magnetic field generated from the magnet so that the difference of outputs between the two magnetic sensors is used to detect the rotation speed of the rotor.

17. The rotary machine according to claim 1, wherein the rotary machine is used as a turbocharger, the rotor is a compressor wheel of the turbocharger, the housing is a compressor housing containing the compressor wheel, and the magnetic sensor is attached to the compressor housing.

18. The rotary machine according to claim 1, wherein the magnetic sensor is a magneto-impedance sensor.

19. The rotary machine according to claim 1, wherein the magnet is attached to the rotation axis.

* * * * *